(12) United States Patent
Wang et al.

(10) Patent No.: US 10,017,174 B2
(45) Date of Patent: Jul. 10, 2018

(54) CONTROL SYSTEM AND CONTROL METHOD OF HYBRID ELECTRIC VEHICLE

(71) Applicant: BYD COMPANY LIMITED, Shenzhen (CN)

(72) Inventors: Jinlong Wang, Shenzhen (CN); Hao Chen, Shenzhen (CN); Ou Ruan, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 102 days.

(21) Appl. No.: 14/917,907

(22) PCT Filed: Sep. 5, 2014

(86) PCT No.: PCT/CN2014/086031
§ 371 (c)(1),
(2) Date: Sep. 27, 2016

(87) PCT Pub. No.: WO2015/032347
PCT Pub. Date: Mar. 12, 2015

(65) Prior Publication Data
US 2017/0001624 A1    Jan. 5, 2017

(30) Foreign Application Priority Data

Sep. 9, 2013 (CN) .......................... 2013 1 0409911
Nov. 11, 2013 (CN) .......................... 2013 1 0558075

(51) Int. Cl.
*B60W 20/15*    (2016.01)
*B60W 30/18*    (2012.01)
(Continued)

(52) U.S. Cl.
CPC ............ *B60W 20/15* (2016.01); *B60W 10/06* (2013.01); *B60W 10/08* (2013.01); *B60W 10/26* (2013.01);
(Continued)

(58) Field of Classification Search
CPC ...... B60W 20/15; B60W 20/13; B60W 20/10; B60W 20/40; B60W 10/26; B60W 10/06;
(Continued)

(56) References Cited

U.S. PATENT DOCUMENTS 5,927,415 A   7/1999  Ibaraki et al.
6,059,059 A   5/2000  Schmidt-Brücken
(Continued)

FOREIGN PATENT DOCUMENTS

CN   1447757        10/2003
CN   1528612 A       9/2004
(Continued)

OTHER PUBLICATIONS

JPO machine translation of JP 2010-241260 (original JP document published Oct. 28, 2010).
(Continued)

*Primary Examiner* — Dale W Hilgendorf
(74) *Attorney, Agent, or Firm* — Alston & Bird LLP

(57) ABSTRACT

A control system for a hybrid electric vehicle comprises a transmission system configured to drive wheels, an engine power subsystem connected to the transmission system, a motor power subsystem connected to the transmission system and a control module. When vehicle's electrical power is on, the control module is configured to control operating mode of the hybrid electric vehicle through the engine power subsystem and the motor power subsystem. The operating mode comprises HEV-eco mode and HEV-s mode. When the hybrid electric vehicle operates in HEV-eco and the hybrid electric vehicle operates at low power or when the hybrid electric vehicle operates in HEV-s mode and when the vehicle speed is zero, the control module enables the hybrid electric vehicle to operate by idle start-stop strategy.

6 Claims, 17 Drawing Sheets

(51) Int. Cl.
| | |
|---|---|
| *B60W 10/06* | (2006.01) |
| *B60W 10/08* | (2006.01) |
| *B60W 10/26* | (2006.01) |
| *B60W 20/10* | (2016.01) |
| *B60W 20/40* | (2016.01) |
| *B60W 20/13* | (2016.01) |
| *B60W 30/182* | (2012.01) |
| *B60K 6/48* | (2007.10) |
| *F02N 11/08* | (2006.01) |
| *F02D 41/22* | (2006.01) |

(52) U.S. Cl.
CPC ............ *B60W 20/10* (2013.01); *B60W 20/13* (2016.01); *B60W 20/40* (2013.01); *B60W 30/182* (2013.01); *B60W 30/18018* (2013.01); *B60W 30/18054* (2013.01); *B60K 6/48* (2013.01); *B60K 2006/4808* (2013.01); *B60W 2510/244* (2013.01); *B60W 2520/04* (2013.01); *B60W 2540/16* (2013.01); *B60W 2550/142* (2013.01); *B60W 2710/086* (2013.01); *B60Y 2300/182* (2013.01); *F02D 41/22* (2013.01); *F02D 2041/224* (2013.01); *F02N 11/0818* (2013.01); *F02N 11/0833* (2013.01); *F02N 2200/02* (2013.01); *F02N 2200/023* (2013.01); *F02N 2200/062* (2013.01); *F02N 2200/08* (2013.01); *F02N 2200/0802* (2013.01); *Y02T 10/48* (2013.01); *Y02T 10/626* (2013.01); *Y02T 10/6221* (2013.01); *Y02T 10/6286* (2013.01); *Y10S 903/93* (2013.01)

(58) Field of Classification Search
CPC ............... B60W 10/08; B60W 30/182; B60W 30/18018; B60Y 2300/182; Y02T 10/48
See application file for complete search history.

(56) References Cited

U.S. PATENT DOCUMENTS

| | | | |
|---|---|---|---|
| 6,137,250 A | 10/2000 | Hirano et al. | |
| 6,177,773 B1 | 1/2001 | Nakano et al. | |
| 6,554,088 B2 | 4/2003 | Severinsky et al. | |
| 7,216,729 B2 | 5/2007 | Syed et al. | |
| 8,018,190 B2 | 9/2011 | Claeys et al. | |
| 8,082,089 B2 | 12/2011 | Morgan et al. | |
| 8,657,045 B2 | 2/2014 | Wang et al. | |
| 8,834,317 B2 | 9/2014 | Wang et al. | |
| 9,145,146 B2* | 9/2015 | Bureau ................ B60W 10/22 | |
| 2001/0039230 A1 | 11/2001 | Severinsky et al. | |
| 2002/0173391 A1 | 11/2002 | Endo et al. | |
| 2004/0026141 A1 | 2/2004 | Notsu et al. | |
| 2004/0210356 A1 | 10/2004 | Wilton et al. | |
| 2005/0256631 A1 | 11/2005 | Cawthorne | |
| 2006/0021808 A1 | 2/2006 | McGee et al. | |
| 2006/0108956 A1 | 5/2006 | Clark et al. | |
| 2006/0231304 A1 | 10/2006 | Severinsky et al. | |
| 2007/0112496 A1 | 5/2007 | Ji | |
| 2007/0173372 A1 | 7/2007 | Ueno | |
| 2007/0293994 A1 | 12/2007 | Zerbini et al. | |
| 2008/0029319 A1 | 2/2008 | Fleckner et al. | |
| 2008/0091314 A1* | 4/2008 | Hayashi ............... B60W 10/26 701/22 |
| 2008/0105477 A1 | 5/2008 | Abe | |
| 2008/0121443 A1 | 5/2008 | Clark et al. | |
| 2008/0146407 A1* | 6/2008 | Tuckfield ............ B60W 10/105 477/34 |
| 2008/0297073 A1 | 12/2008 | Yatabe et al. | |
| 2009/0306843 A1 | 12/2009 | Jinno et al. | |
| 2009/0321161 A1 | 12/2009 | Tang | |
| 2010/0030416 A1 | 2/2010 | Jinno | |
| 2010/0030447 A1 | 2/2010 | Smyth et al. | |
| 2010/0038159 A1 | 2/2010 | Jinno et al. | |
| 2010/0063661 A1 | 3/2010 | Saito | |
| 2010/0106355 A1 | 4/2010 | Hattori et al. | |
| 2010/0131217 A1 | 5/2010 | Ichikawa | |
| 2010/0145560 A1 | 6/2010 | Komatsu et al. | |
| 2010/0152938 A1 | 6/2010 | Aoki et al. | |
| 2010/0250041 A1 | 9/2010 | Li | |
| 2010/0300781 A1 | 12/2010 | Leone | |
| 2011/0071748 A1 | 3/2011 | Nishigaki et al. | |
| 2011/0082611 A1 | 4/2011 | Shiba | |
| 2011/0130906 A1 | 6/2011 | Mayer | |
| 2011/0130916 A1 | 6/2011 | Mayer | |
| 2011/0166733 A1 | 7/2011 | Yu et al. | |
| 2011/0172865 A1 | 7/2011 | Liang et al. | |
| 2011/0269599 A1 | 11/2011 | Nakasako | |
| 2011/0276209 A1 | 11/2011 | Suganuma et al. | |
| 2011/0288708 A1 | 11/2011 | Katono et al. | |
| 2011/0307130 A1 | 12/2011 | Gow et al. | |
| 2012/0072063 A1 | 3/2012 | Kato et al. | |
| 2012/0082536 A1 | 4/2012 | Kawashima et al. | |
| 2012/0083948 A1 | 4/2012 | Tate, Jr. et al. | |
| 2012/0323430 A1 | 12/2012 | Nakamura et al. | |
| 2013/0030634 A1 | 1/2013 | Endo et al. | |
| 2013/0060409 A1 | 3/2013 | Matsushita et al. | |
| 2013/0124026 A1 | 5/2013 | Ueno et al. | |
| 2013/0166122 A1 | 6/2013 | Iino | |
| 2013/0173107 A1 | 7/2013 | Kokon | |
| 2013/0245912 A1 | 9/2013 | Boot | |
| 2013/0249488 A1 | 9/2013 | Ju et al. | |
| 2013/0253743 A1 | 9/2013 | Maruyama et al. | |
| 2013/0304295 A1 | 11/2013 | Tagawa et al. | |
| 2014/0076085 A1 | 3/2014 | Walters et al. | |
| 2014/0077941 A1 | 3/2014 | Yamamura et al. | |
| 2014/0156132 A1 | 6/2014 | Ichimoto | |
| 2014/0163803 A1 | 6/2014 | Kamatani et al. | |
| 2014/0229043 A1* | 8/2014 | Frank .................... B60W 20/20 701/22 |
| 2014/0244087 A1 | 8/2014 | Jeong et al. | |
| 2014/0274522 A1 | 9/2014 | Davis et al. | |
| 2014/0288757 A1 | 9/2014 | Hirasawa et al. | |
| 2015/0002053 A1 | 1/2015 | Endo et al. | |
| 2015/0039167 A1* | 2/2015 | Ideshio ................. B60W 20/15 701/22 |
| 2015/0126329 A1 | 5/2015 | Johri et al. | |
| 2015/0134160 A1 | 5/2015 | Liang et al. | |
| 2015/0291149 A1 | 10/2015 | Kitabatake et al. | |
| 2015/0336558 A1 | 11/2015 | Yamazaki | |
| 2015/0367843 A1 | 12/2015 | West et al. | |
| 2016/0221570 A1 | 8/2016 | Chen et al. | |
| 2016/0221571 A1 | 8/2016 | Chen et al. | |
| 2016/0325728 A1 | 11/2016 | Yang et al. | |
| 2017/0036662 A1 | 2/2017 | Chen et al. | |

FOREIGN PATENT DOCUMENTS

| | | |
|---|---|---|
| CN | 1665697 | 9/2005 |
| CN | 1895942 | 1/2007 |
| CN | 1944139 | 4/2007 |
| CN | 101096180 | 1/2008 |
| CN | 101125548 | 2/2008 |
| CN | 101161523 A | 4/2008 |
| CN | 101186209 A | 5/2008 |
| CN | 101214797 | 7/2008 |
| CN | 101402314 A | 4/2009 |
| CN | 201214410 Y | 4/2009 |
| CN | 101445044 | 6/2009 |
| CN | 101445105 | 6/2009 |
| CN | 101587212 | 11/2009 |
| CN | 101618718 A | 1/2010 |
| CN | 101652538 A | 2/2010 |
| CN | 101674950 A | 3/2010 |
| CN | 101687507 A | 3/2010 |
| CN | 101830219 A | 9/2010 |
| CN | 101830222 A | 9/2010 |
| CN | 102009651 | 4/2011 |
| CN | 102009652 A | 4/2011 |
| CN | 102030005 A | 4/2011 |
| CN | 102126496 A | 7/2011 |
| CN | 102166963 A | 8/2011 |
| CN | 102180169 A | 9/2011 |

(56) References Cited

FOREIGN PATENT DOCUMENTS

| | | | |
|---|---|---|---|
| CN | 102224047 | A | 10/2011 |
| CN | 102267458 | A | 12/2011 |
| CN | 102336148 | A | 2/2012 |
| CN | 102358283 | A | 2/2012 |
| CN | 102427980 | A | 4/2012 |
| CN | 102490722 | A | 6/2012 |
| CN | 102612448 | A | 7/2012 |
| CN | 102658817 | A | 9/2012 |
| CN | 102712313 | A | 10/2012 |
| CN | 102745092 | A | 10/2012 |
| CN | 102815295 | | 12/2012 |
| CN | 102849064 | A | 1/2013 |
| CN | 102849066 | A | 1/2013 |
| CN | 103158695 | A | 6/2013 |
| CN | 103189258 | A | 7/2013 |
| CN | 103201153 | A | 7/2013 |
| CN | 103249624 | A | 8/2013 |
| CN | 103269926 | A | 8/2013 |
| DE | 102007016515 | A1 | 10/2008 |
| DE | 102009039615 | | 3/2011 |
| DE | 102010060681 | | 5/2012 |
| DE | 102011122307 | | 6/2013 |
| EP | 0 867 323 | A2 | 9/1998 |
| EP | 1 813 794 | A1 | 8/2007 |
| EP | 2 063 088 | A1 | 5/2009 |
| EP | 2 112 015 | A1 | 10/2009 |
| EP | 2 127 981 | A1 | 12/2009 |
| EP | 2 133 252 | A1 | 12/2009 |
| EP | 2 168 827 | A1 | 3/2010 |
| EP | 2 226 229 | A1 | 9/2010 |
| EP | 2 308 732 | A1 | 4/2011 |
| EP | 2 371 645 | A1 | 10/2011 |
| EP | 2 371 646 | A1 | 10/2011 |
| EP | 2 409 871 | A2 | 1/2012 |
| EP | 2 460 704 | A1 | 6/2012 |
| EP | 2 546 089 | A2 | 1/2013 |
| JP | 2006-050704 | A | 2/2006 |
| JP | 2006-094626 | | 4/2006 |
| JP | 2006-183547 | A | 7/2006 |
| JP | 2008-128192 | | 6/2008 |
| JP | 2008-168700 | | 7/2008 |
| JP | 2008271781 | | 11/2008 |
| JP | 2009-090735 | | 4/2009 |
| JP | 2009-166516 | | 7/2009 |
| JP | 2009-198223 | | 9/2009 |
| JP | 2010-179789 | A | 8/2010 |
| JP | 2010-241260 | | 10/2010 |
| JP | 2010-242575 | A | 10/2010 |
| JP | 2011-189814 | A | 9/2011 |
| JP | 2011-213166 | | 10/2011 |
| JP | 2012-086701 | A | 5/2012 |
| JP | 2012-091563 | | 5/2012 |
| JP | 2013-086704 | | 5/2013 |
| KR | 100887797 | B1 | 3/2009 |
| WO | WO 2008/108498 | A1 | 9/2008 |
| WO | WO 2009/008546 | A1 | 1/2009 |
| WO | WO-2010/143077 | A2 | 12/2010 |
| WO | WO 2012/059999 | A1 | 5/2012 |
| WO | WO 2012123486 | A1 * | 9/2012 ............ B60W 10/22 |
| WO | WO-2012/153395 | | 11/2012 |
| WO | WO 2013084333 | A1 * | 6/2013 ............ B60W 20/15 |
| WO | WO-2013/110706 | A1 | 8/2013 |
| WO | WO 2013/072992 | A1 | 4/2015 |

OTHER PUBLICATIONS

EPO machine translation of DE 102010060681 (original DE document published May 24, 2012).

"Cruise Control—Wikipedia, the free encyclopedia." [retrieved May 8, 2017]. Retrieved via the Internet Archive Wayback Machine at <URL: https://web.archive.org/web/20130828091003/https://en.wikipedia.org/wiki/Cruise_control>. (dated Aug. 13, 2013). 8 pages.
Search Report for Chinese Patent Application No. 201310444535.3 dated Dec. 23, 2013, 5 pages.
Office Action from Chinese Patent Application No. 201310444535.3 dated Jun. 16, 2016, with English translation, 21 pages.
Extended European Search Report for European Patent Application No. 14842364.3 dated Apr. 11, 2017, 11 pages.
Extended European Search Report for European Patent Application No. 14842235.5 dated Apr. 20, 2017, 8 pages.
Extended European Search Report for European Patent Application No. 14842391.6 dated Apr. 20, 2017, 9 pages.
Extended European Search Report for European Patent Application No. 14842721.4 dated Apr. 20, 2017, 8 pages.
Extended European Search Report for European Patent Application No. 14843096.0 dated Apr. 20, 2017, 8 pages.
Extended European Search Report for European Patent Application No. 14841488.1 dated May 4, 2017, 9 pages.
Extended European Search Report for European Patent Application No. 14842854.3 dated May 11, 2017, 10 pages.
Office Action for U.S. Appl. No. 14/917,884 dated Apr. 3, 2017, 35 pages.
Office Action for U.S. Appl. No. 14/917,895 dated Apr. 7, 2017, 31 pages.
Office Action for U.S. Appl. No. 14/917,895 dated Sep. 5, 2017, 13 pages.
Office Action for U.S. Appl. No. 14/917,881 dated Jun. 26, 2017, 16 pages.
Office Action for U.S. Appl. No. 14/917,878 dated Dec. 7, 2016.
International Search Report and Written Opinion from International Application No. PCT/CN2014/085825 dated Nov. 13, 2014.
International Search Report and Written Opinion from International Application No. PCT/CN2014/085826 dated Nov. 15, 2014.
International Search Report and Written Opinion from International Application No. PCT/CN2014/085828 dated Dec. 1, 2014.
International Search Report and Written Opinion from International Application No. PCT/CN2014/085829 dated Dec. 3, 2014.
International Search Report and Written Opinion from International Application No. PCT/CN2014/085830 dated Nov. 19, 2014.
International Search Report and Written Opinion from International Application No. PCT/CN2014/086018 dated Dec. 17, 2014.
International Search Report and Written Opinion from International Application No. PCT/CN2014/086023 dated Dec. 12, 2014.
International Search Report and Written Opinion from International Application No. PCT/CN2014/086025 dated Dec. 10, 2014.
International Search Report and Written Opinion from International Application No. PCT/CN2014/086031 dated Dec. 3, 2014.
Notice of Allowance for U.S. Appl. No. 14/917,884 dated Oct. 12, 2017, 24 pages.
Office Action for U.S. Appl. No. 14/917,887 dated Nov. 16, 2017, 9 pages.
Office Action for U.S. Appl. No. 14/917,881 dated Dec. 8, 2017, 9 pages.
Corrected Notice of Allowability for U.S. Appl. No. 14/917,884 dated Nov. 14, 2017, 2 pages.
Corrected Notice of Allowability for U.S. Appl. No. 14/917,884 dated Jan. 2, 2018, 3 pages.
Office Action for U.S. Appl. No. 14/917,895 dated Jan. 8, 2018, 39 pages.
Office Action for U.S. Appl. No. 14/917,866 dated Jan. 9, 2018, 38 pages.

* cited by examiner

CONTROL SYSTEM AND CONTROL METHOD OF HYBRID ELECTRIC VEHICLE

FIELD

The example embodiments of the present invention generally relate to vehicles, and more particularly to control systems and control methods of hybrid electric vehicles.

BACKGROUND

A hybrid electrical vehicle (HEV) refers to a vehicle equipped with two types of power sources, i.e., a thermal power source (generating power by a conventional gasoline engine or diesel engine) and an electric power source (generating power by a battery and an electric motor). With disposing the electric motor in the hybrid electrical vehicle, the power system can be adjusted flexibly according to the practical working conditions of the hybrid electrical vehicle and the engine can keep working in regions with the optimum comprehensive properties, thus reducing the oil wear and the emission.

Some of the existing hybrid electrical vehicles adopt a series-parallel hybrid power system, which is characterized by disposing one mechanical gear shifting mechanism in the internal combustion engine system and the electric motor drive system respectively. The two mechanical gear shifting mechanisms are connected via a planetary wheel structure, such that the rotating speed relationship between the internal combustion engine system and the electric motor drive system can be adjusted synthetically.

However, the driving mode of the conventional hybrid electrical vehicle is simplex and the driver cannot select the driving mode according to individual driving habits, the long term and constant driving condition. For example, considering that in Asian countries, people often live in concentrated districts and have a relatively constant driving path to and from work which is mostly less than 50 km, it is very appropriate to drive in a pure electric driving mode. However, the conventional hybrid electrical vehicle reduces the oil wear by adjusting the engine via the electric motor instead of eliminating the oil wear totally. Therefore, the conventional hybrid electrical vehicle generally does not have the manual electrical vehicle (EV) mode switching function. Even if the conventional electrical vehicle has the manual EV mode switching function, the pure electric driving mileage of the vehicle is short due to the limitation of the electric quantity of the battery.

Moreover, since the purpose of the conventional hybrid electrical vehicle is to reduce the oil wear, the electric motor and engine with a high power and a high torque will not be selected, and thus the power performance of the hybrid electrical vehicle is low and the driving fun is greatly reduced. For example, some hybrid electrical vehicles take more than 10 s to accelerate from 0 to 100 km/h and provide a poor high speed performance.

Furthermore, some conventional hybrid electrical vehicles adopt the series-parallel structure and the method for controlling the series-parallel structure, and the strategy in which the engine drives the vehicle solely does not exist. In other words, even if in the relatively economical working regions, the engine still charges the battery via a first electric motor MG1 and adjusts the rotating speed thereof via the first electric motor MG1 to implement the gear shift; moreover, in the heavy load acceleration condition, due to the limitation of the battery capacity, only if a part of the power of the engine is used to drive the first electric motor MG1 to generate power, can the engine provide the electric energy to the second electric motor MG2 together with the battery. The above facts reduce the driving efficiency of the engine. In addition, in the engine stop-start strategy, the predetermined demanded power and speed threshold are relatively low, and the speed switching condition is set as a point instead of an interval, thus resulting in a premature and frequent start of the engine.

In addition, some conventional hybrid electrical vehicles do not adopt the plug-in structure due to the small capacity of the battery, and the electric quantity of the battery is converted from the gasoline totally, thus increasing the cost. Moreover, the series-parallel structure is complex and it is difficult to match with the Electronic Continuously Variable Transmission (ECVT), and the cost is high.

BRIEF SUMMARY

When a hybrid electric vehicle idles, the hybrid electric vehicle stops. The engine operates at low speeds, which may increase fuel consumption. The emission is hard to control. The idle start-stop strategy of the engine is to turn off the engine of the vehicle when the vehicle stops (such as at the stoplights). The engine is then enabled to start when the vehicle is moving again. The engine will reengage to provide more power for acceleration if needed. Engine idle start-stop function enables the engine to start or stop by monitoring variables indicative of the vehicle status, thereby reducing fuel consumption and emission.

Existing engine idle start-stop strategy employs an engine control module (ECM) to receive signals from hybrid control unit (HCU) by Controller Area Network (CAN) busbar. The engine idle start-stop function enables the engine to start or stop by monitoring temperature of the engine coolant, vehicle speed, vehicle air conditioning (A/C) system, accelerator position, and auxiliary brake vacuum pump.

In a hybrid electric vehicle (HEV), a work mode includes EV mode and HEV mode, and a driving mode may include economy mode and sport mode. The EV mode includes two operating modes such as EV-eco mode and EV-s mode, and the HEV mode includes two operating modes such as HEV-eco mode and HEV-s mode. The operator can manually select a work mode or/and a driving mode. However, the conventional idle start-stop strategy of the engine does not take into factors associated with the work mode and the driving mode that may cause the vehicle to operate in an inappropriate operating mode, thereby having a negative impact on driving performance of the hybrid electric vehicle. Hybrid electric vehicles typically startup in EV mode. If work mode and driving mode are not monitored during startups, the engine may start before idle start-stop conditions are met.

Moreover, the existing engine idle start-stop system does not detect fault of a high pressure system. The engine idles even when a fault has occurred in a high pressure system. As a result of the fault, the electric quantity (SOC) of the power battery will drop dramatically, or the power battery will be depleted, thereby possibly having negative impact on electrical equipment or causing damage to electrical equipment.

The existing idle start-stop system of the engine does not monitor upper limit and lower limit of variables (water temperature at the engine thermostat or battery discharge limit). When the values of variables vary around their respective limits, the engine may start and stop frequently, which may result in increasing the fuel consumption and negatively affect the life of the engine.

The present invention desires to address problems of frequent transition between different operating modes, negative impact on or damages to electrical equipment, and frequent ignition.

According to one exemplary embodiment of the present invention, the transmission system drives wheels. The engine power subsystem is connected to the transmission system. The motor power subsystem is connected to the transmission system. When the vehicle's electric power is on, the control module is configured to control the operating mode of the hybrid electric vehicle by the engine power subsystem and the motor power subsystem. The operating mode comprises HEV-eco mode and HEV-s mode. When the hybrid electric vehicle operates in HEV-eco and the hybrid electric vehicle operates a low power manner, or when the hybrid electric vehicle operates in HEV-s mode, if the vehicle speed is zero, the control module enables the hybrid electric vehicle to operate by idle start-stop strategy.

According to one exemplary embodiment of the present invention, a system of controlling a hybrid electric vehicle is provide. In a control system in accordance with embodiments of the present invention, compared to the series configuration employed by the power system on an existing hybrid electric vehicle, the parallel configuration employed by the engine power subsystem and the motor power subsystem improves energy efficiency. Since the series-parallel configuration is complex, it is hard to make it compatible with ECVT, which may increase the cost. Complex operation employed in series-parallel configuration to switch between modes is avoided. Smooth operation between different operating modes and economy performance are improved without sacrificing dynamic performance. The idle start-stop strategy may reduce the fuel emissions and frequent starts and stops, which may help to extend the life of the motor. The engine idle start-stop function is disabled when power is not on, which may guarantee the power supply to the electrical equipment.

According to one exemplary embodiment of the present invention, a method of controlling a hybrid electric vehicle is provided. By implementing the control method, the engine power subsystem is connected to the transmission system. The motor power subsystem is connected to the transmission system. When power is on, the control module is configured to control the operating mode of the hybrid electric vehicle by the engine power subsystem and the motor power subsystem. The operating mode comprises HEV-eco mode and HEV-s mode. When the hybrid electric vehicle operates in HEV-eco and the hybrid electric vehicle operates in a low power manner, or when the hybrid electric vehicle operates in HEV-s mode, if the vehicle speed is zero, the control module enables the hybrid electric vehicle to operate by idle start-stop strategy.

According to one exemplary embodiment of the present invention, in a control system in accordance with embodiments of the present invention, multiple operating modes available for user selection can meet drive demand under different road conditions, such as electric-only in city and dynamic performance in country. The idle start-stop strategy may reduce the fuel emissions and frequent starts and stops, which may help to extend the life of the motor. The engine idle start-stop function may be disabled when power is not on, which may guarantee the power supply to the electrical equipment.

BRIEF DESCRIPTION OF THE DRAWING(S)

Having thus described example embodiments of the present invention in general terms, reference will now be made to the accompanying drawings, which are not necessarily drawn to scale, and wherein:

Figure 13:
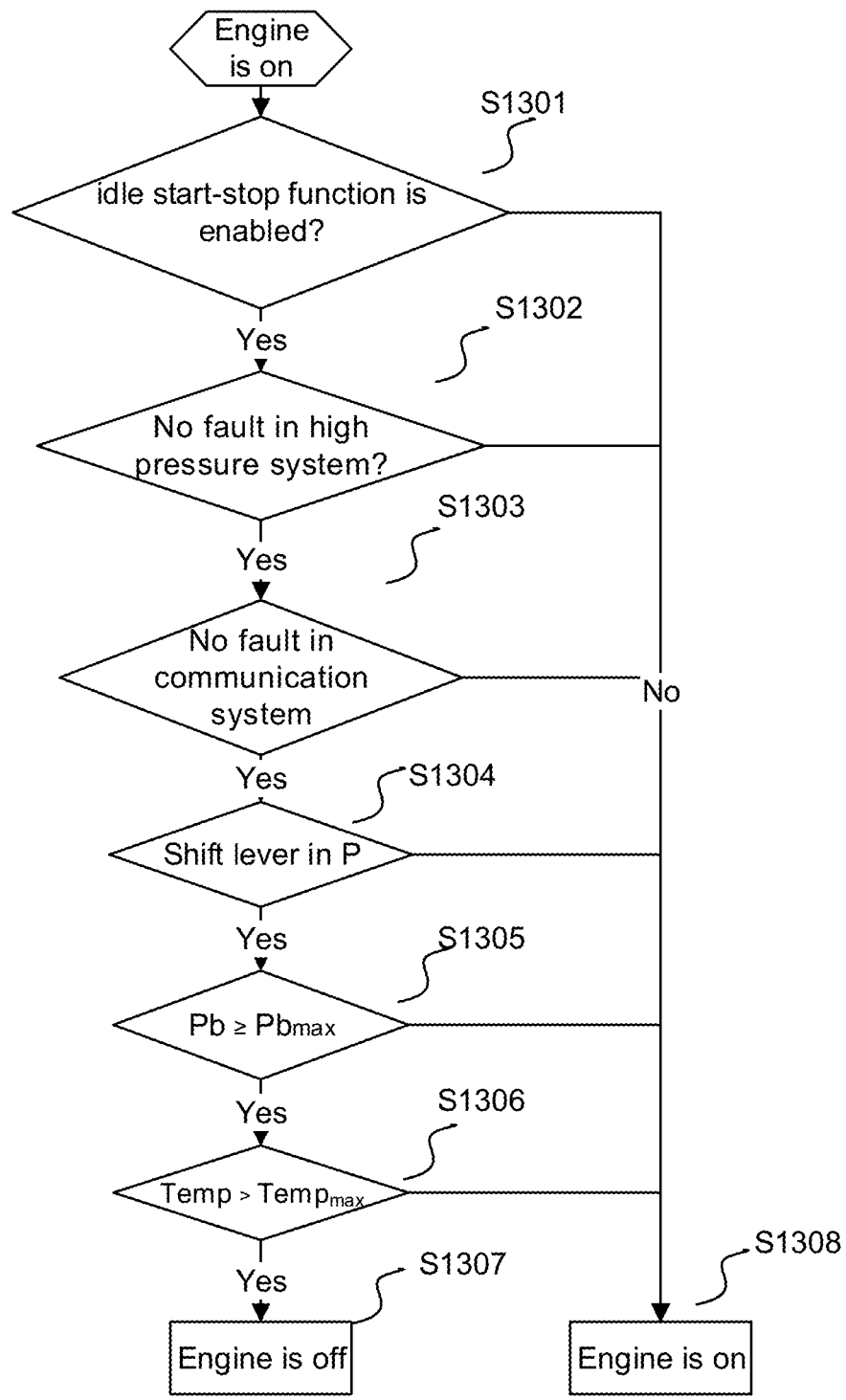
Figure 14:
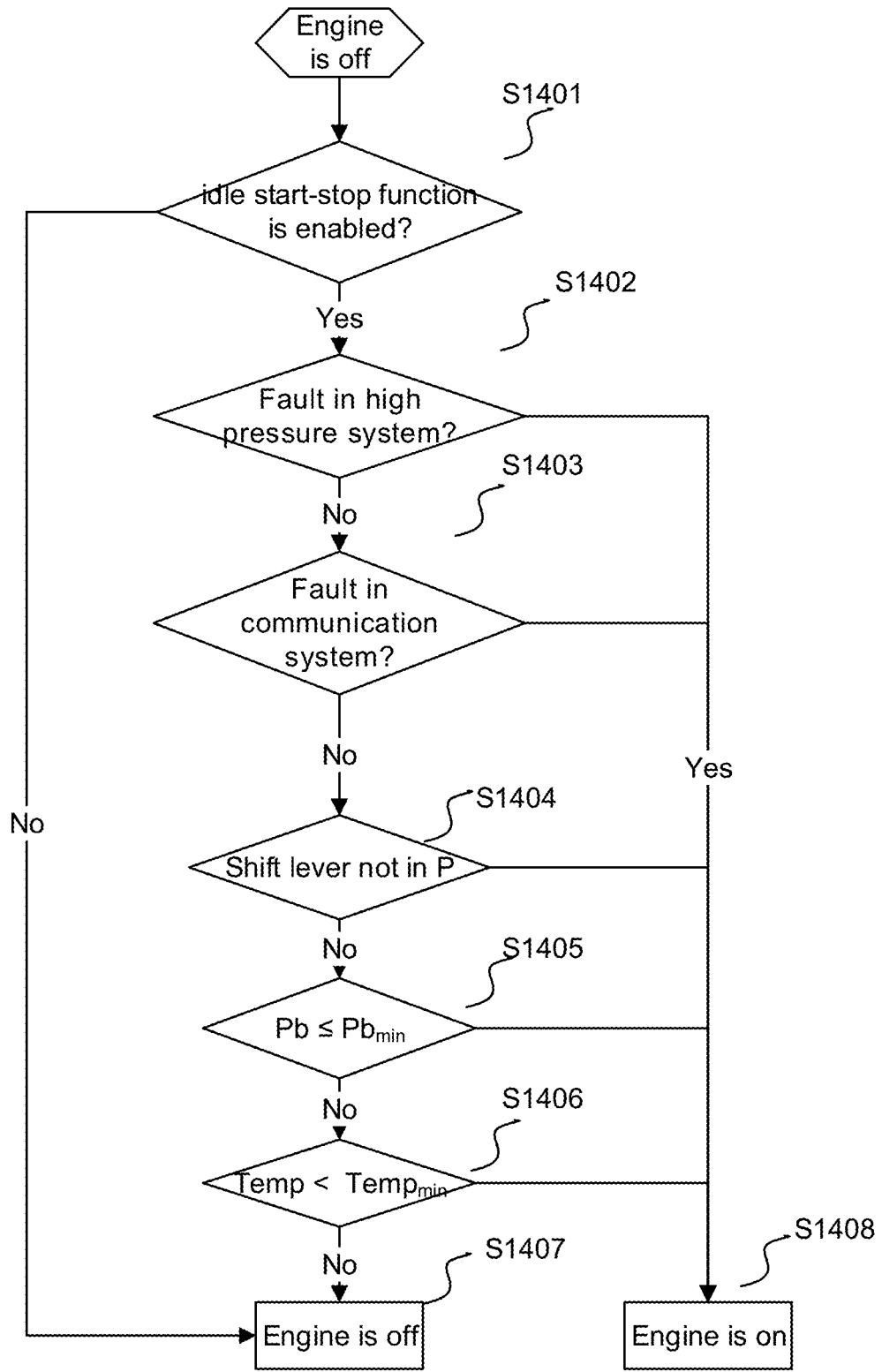

FIG. 13 is a flowchart illustrating a method of determining conditions of stopping the engine when hybrid electric vehicle operates by idle start-stop strategy and engine turns on in accordance with some example embodiments; and FIG. 14 a flowchart illustrating a method of determining conditions of starting engine when hybrid electric vehicle operates by idle start-stop strategy and engine turns off in accordance with some example embodiments.

DETAILED DESCRIPTION

The present disclosure now will be described more fully with reference to the accompanying drawings, in which some, but not all embodiments of the disclosure are shown. This disclosure may be embodied in many different forms and should not be construed as limited to the embodiments set forth. Like numbers refer to like elements throughout.

This disclosure may be embodied in many different forms and should not be construed as limited to the embodiments set forth; rather, these example embodiments are provided so that this disclosure will be thorough and complete, and will fully convey the scope of the disclosure to those skilled in the art.

Terms in this disclosure shall be interpreted with a broad meaning. For example, "connect" could be interpreted as mechanically connect or electrically connect. One element could be directly connected to another element or indirectly connected to another element through other media. One of ordinary skill in the art gives a particular interpretation within a context.

Detailed description of embodiments illustrating control systems and control methods of hybrid electric vehicles are described in conjunction with the accompanying drawings.

Figure 1A:
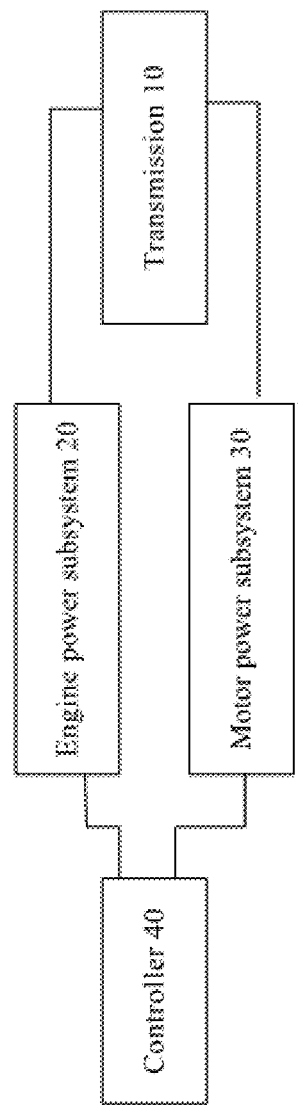
FIG. 1A illustrates a schematic block diagram of a control system of a hybrid electric vehicle in accordance with some example embodiments.

FIG. 1A illustrates a schematic block diagram of a control system of a hybrid electric vehicle in accordance with some example embodiments. The control system of a hybrid electric vehicle comprises a transmission system 10, an engine power subsystem 20, a motor power subsystem 30, and a control module 40.

The transmission system 10 is configured to drive wheels 2a and 2b. The engine power subsystem 20 is connected to the transmission system 10. The motor power subsystem 30 is connected to the transmission subsystem 10. When the electrical power of the vehicle is on, the control module 40 is configured to control the hybrid electric vehicle to operate in corresponding operating modes by controlling the engine power subsystem 20 and the motor power subsystem 30. The operating modes include HEV-eco mode and HEV-s mode. When the hybrid electric vehicle operates in HEV-eco and the hybrid electric vehicle operates in a low power manner, or when the hybrid electric vehicle operates in HEV-s mode, if the vehicle speed is zero, the control module 40 enables the hybrid electric vehicle to operate by idle start-stop strategy.

Figure 1B:
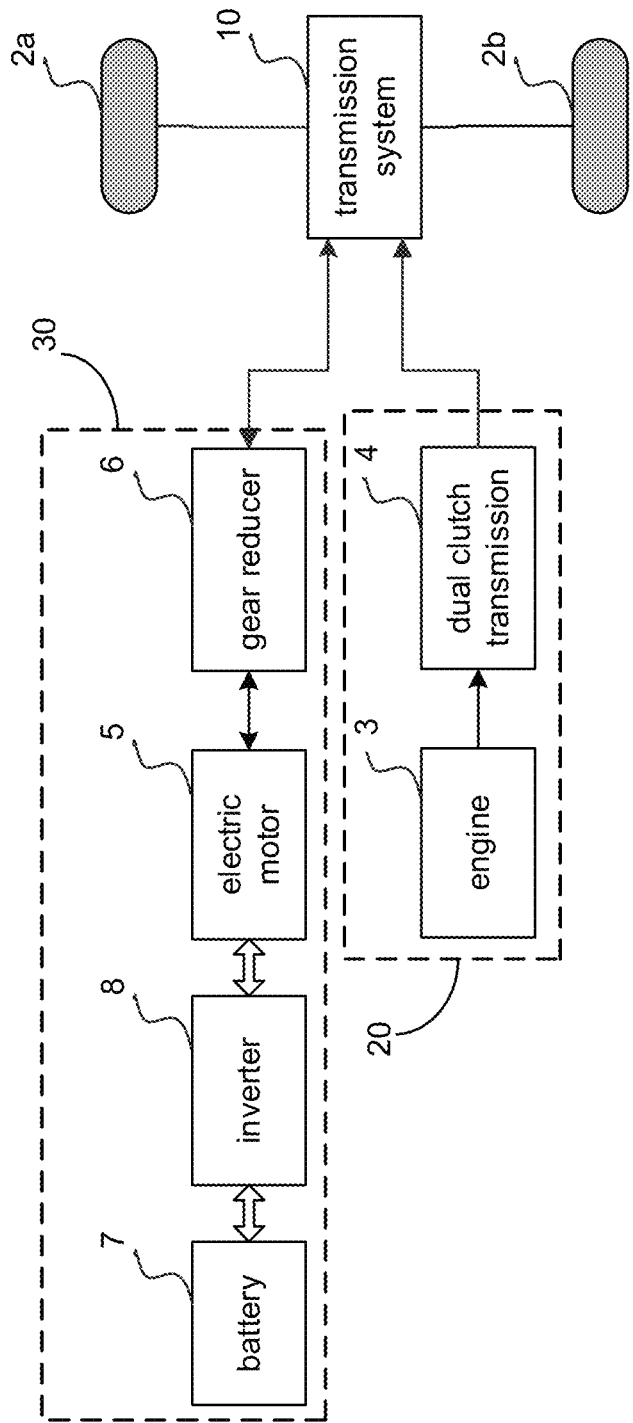
FIG. 1B illustrates a schematic block diagram of a control system of a hybrid electric vehicle in accordance with some example embodiments.

FIG. 1B illustrates a schematic block diagram of a control system of a hybrid electric vehicle in accordance with some example embodiments. The engine power subsystem 20 includes an engine 3 and a dual clutch transmission 4. The motor power subsystem 30 includes an electric motor 5, a gear reducer 6, a power battery 7, and an inverter 8. The engine 3 is connected to the transmission system 10 through the dual clutch transmission 4. The motor 5 is connected with the transmission system 10 through the gear reducer 6. The power battery 7 provides power to the electric motor 5.

In one embodiment of the present invention, the above-described hybrid electric vehicle may have a dual-mode plug-in hybrid structure where the engine 3 is a turbocharged direct injection engine configured to provide power to the vehicle. The transmission 4 is a dual clutch transmission configured to transmit the power provided by the engine 3. The power battery 7 is connected to the inverter 8 via a DC bus. The inverter 8 is connected with the electric motor 5 via a three-phase AC bus. The electric power couples with the fuel power in the transmission system 10. The transmission system 10 transmits the power to the wheels 2a and 2b. The operator can manually select work mode of the hybrid electric vehicle by EV mode selection button, HEV mode selection button, and driving mode selection button.

Figure 1C:
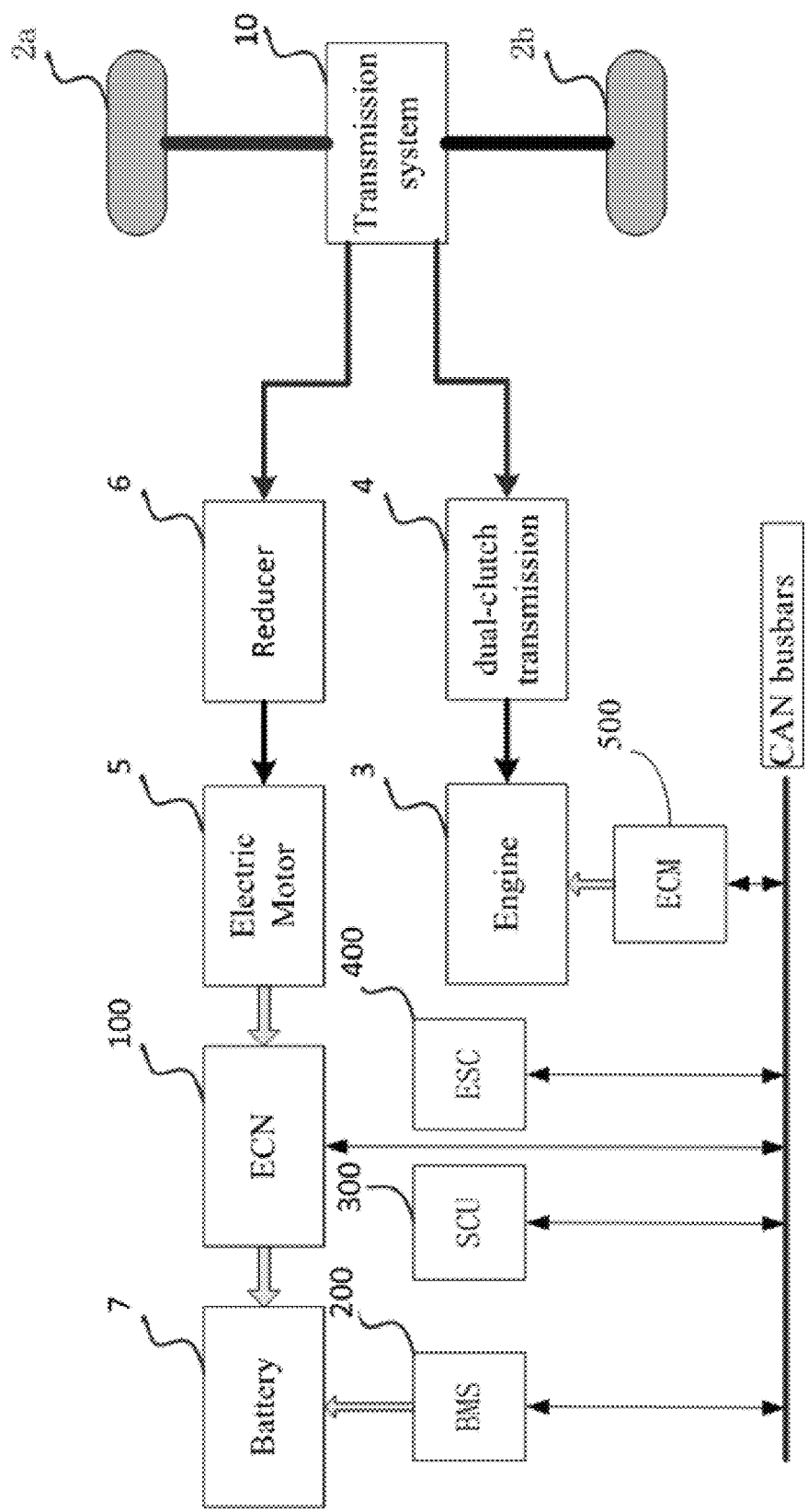
FIG. 1C illustrates a block diagram of an idle start-stop control system in accordance with some example embodiments.

Specifically, FIG. 1C illustrates a block diagram of an idle start-stop control system in accordance with some example embodiments. As shown in FIG. 1C, the idle start-stop control system includes a power battery 7. The power battery 7 is connected to an ECN (Electromotor Controller, motor control device) 100 via the DC bus. The ECN 100 is connected to the electric motor 5 via the three-phase AC bus. The motor 5 is connected to the transmission system 10 via the reducer 6. The engine 3 is connected to the transmission system 10 via the dual-clutch transmission 4. The electric power couples with the fuel power in the transmission system 10. The transmission system 10 then transmits the power to the wheels 2a and 2b. BMS (Battery Management System) 200, SCU (Shift Control Unit, position controller) 300, and ESC (Electronic Stability Control, Electronic Stability Control system) 400 communicate with the ECN 100 through CAN bus.

Figure 2A:
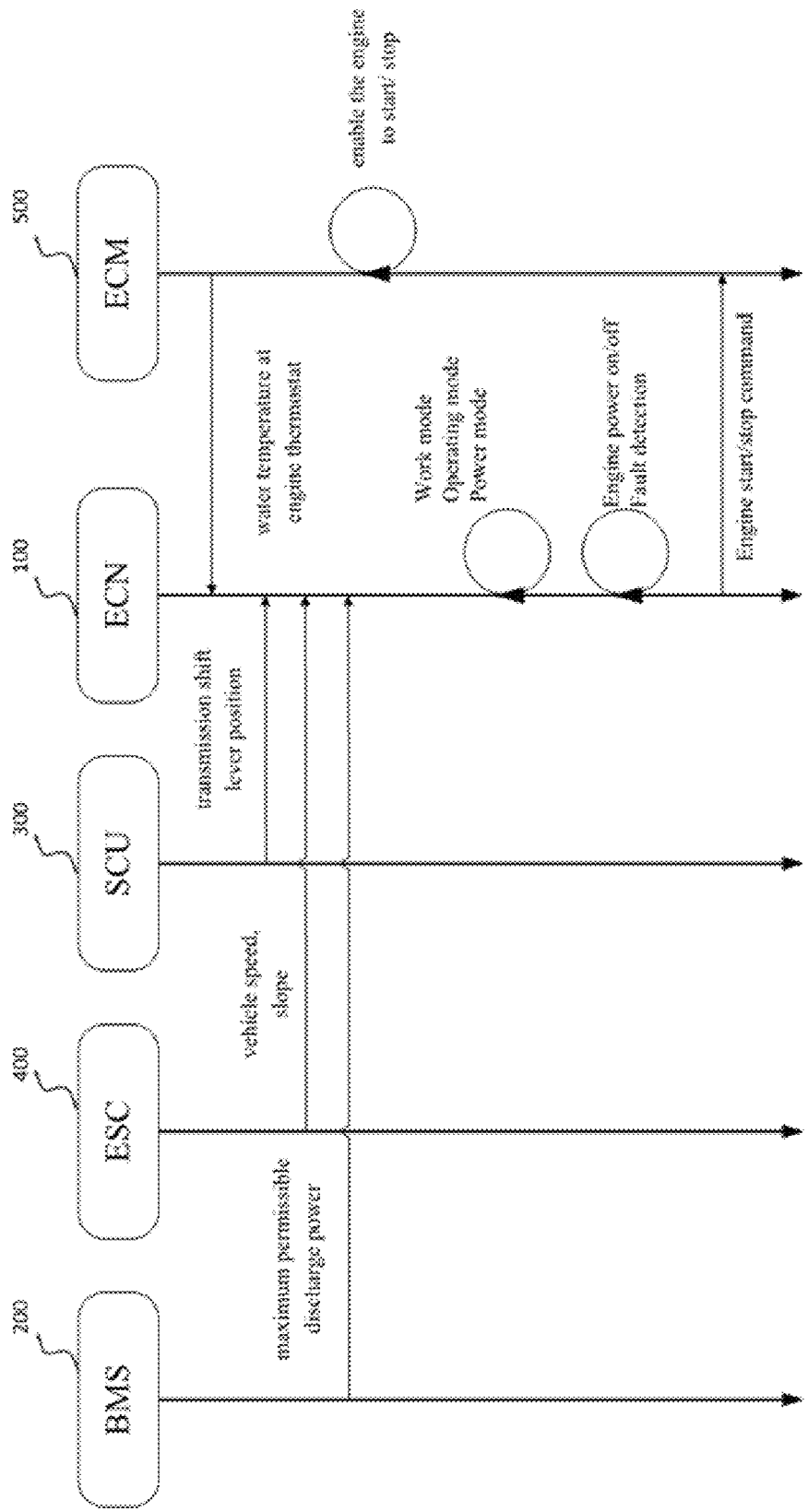
FIG. 2A illustrates a signal flow diagram of a control method by idle start-stop strategy in accordance with some example embodiments.

FIG. 2A illustrates a signal flow diagram of an idle start-stop control system in accordance with some example embodiments. The idle start-stop control system may control the engine according to status signals, such as vehicle speed signal indicative of vehicle speed that is determined by the ESC 400, shift position signal indicative of transmission shift lever position that is determined by the SCU 300, water temperature signal indicative of water temperature at engine thermostat that is determined by the ECM 500, and maximum power signal indicative of maximum allowable discharge power that is determined by the BMS 200. These status signals are transmitted via CAN messages to the ECN 100. The ECN 100 then sends "engine start/stop command" to the ECM 500 based upon the above status signals as well as operating mode, work mode and power status. ECM 500 may enable the engine to start or stop upon receipt of the CAN messages.

According to one embodiment, the work mode may include an electric-only mode (EV mode) and a hybrid mode (HEV mode). The EV mode may include electric-alone economy mode (EV-eco mode) and electric-alone sport mode (EV-s mode). The hybrid mode may include hybrid economy mode (HEV-eco mode) and hybrid sport mode (HEV-s mode). EV mode selection button may be available for an operator to manually select the EV mode. HEV mode selection button may be available for an operator to manually select the HEV mode. The driving mode selection button is available for an operator to manually switch between eco and sport mode.

In an embodiment of the present invention, operator can manually switch between two work modes: either EV mode or HEV mode. The operator can also manually switch between two driving modes: either economy mode or sport mode. In this manner, four operating modes are obtained and available for the operator's selection: EV-eco, EV-s, HEV-eco, and HEV-s. EV mode allows the vehicle to operate entirely on electric motor. HEV mode allows the electric motor to supplement the engine's power, thereby achieving better performance. In economy mode, the electric motor, engine, and battery may not deliver their respective maximum output power, thereby keeping all of them to work in economic mode. By contrast, sport mode supports dynamic priority strategy. Accordingly, in sport mode, the electric motor, engine, and battery may deliver their respective maximum output power, thereby obtaining all energy generated by the electric motor, engine, and battery.

Figure 2B:
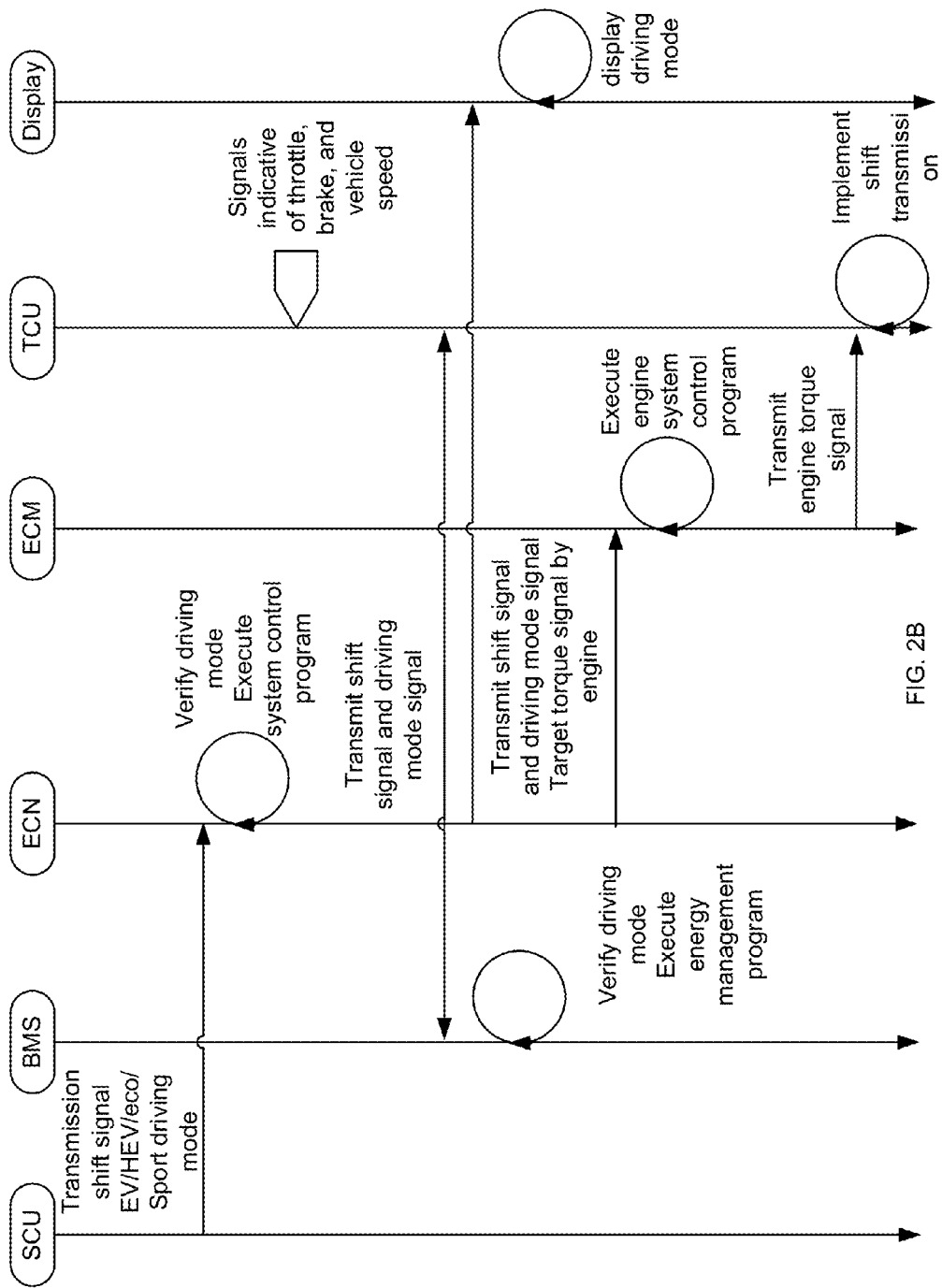
FIG. 2B illustrates a signal flow diagram of a control method in accordance with some example embodiments.

FIG. 2B illustrates a signal flow diagram of a hybrid electric vehicle in accordance with some example embodiments. With reference to FIG. 2B, the SCU is configured to collect a shift signal indicative of shift level position as well as a operating mode signal indicative of an operating mode, i.e., EV/HEV/eco/sport. The shift signal and the operating mode signal are sent to the ECN for verification. Upon verification, the ECN transmits the shift signal as well as the driving mode signal to the BMS, the ECM, a TCU (Transmission Control Unit), and a display device. The ECN may execute a corresponding system control program based upon driving mode and send to the ECM an engine start/stop command as well as an engine target torque signal indicative of an engine target torque. The BMS may verify the driving mode signal upon receipt and execute an energy management program. The ECM may execute an engine system control program and transmit to the TCU an engine torque signal indicative of current torque value. The ECN may collect signals associated with throttle, brake, and vehicle speed. The ECN may also implement shift transmission according to the transmission shift strategy. The display device displays the current operating mode, one of the EV-eco, EV-s, HEV-eco, and HEV-s modes.

In one embodiment of the present invention, the control module 40 is configured to select one of EV-eco-mode, EV-s mode, HEV-eco mode, and HEV-s mode according to the driving status of the vehicle and/or the status of the power battery.

Figure 3:
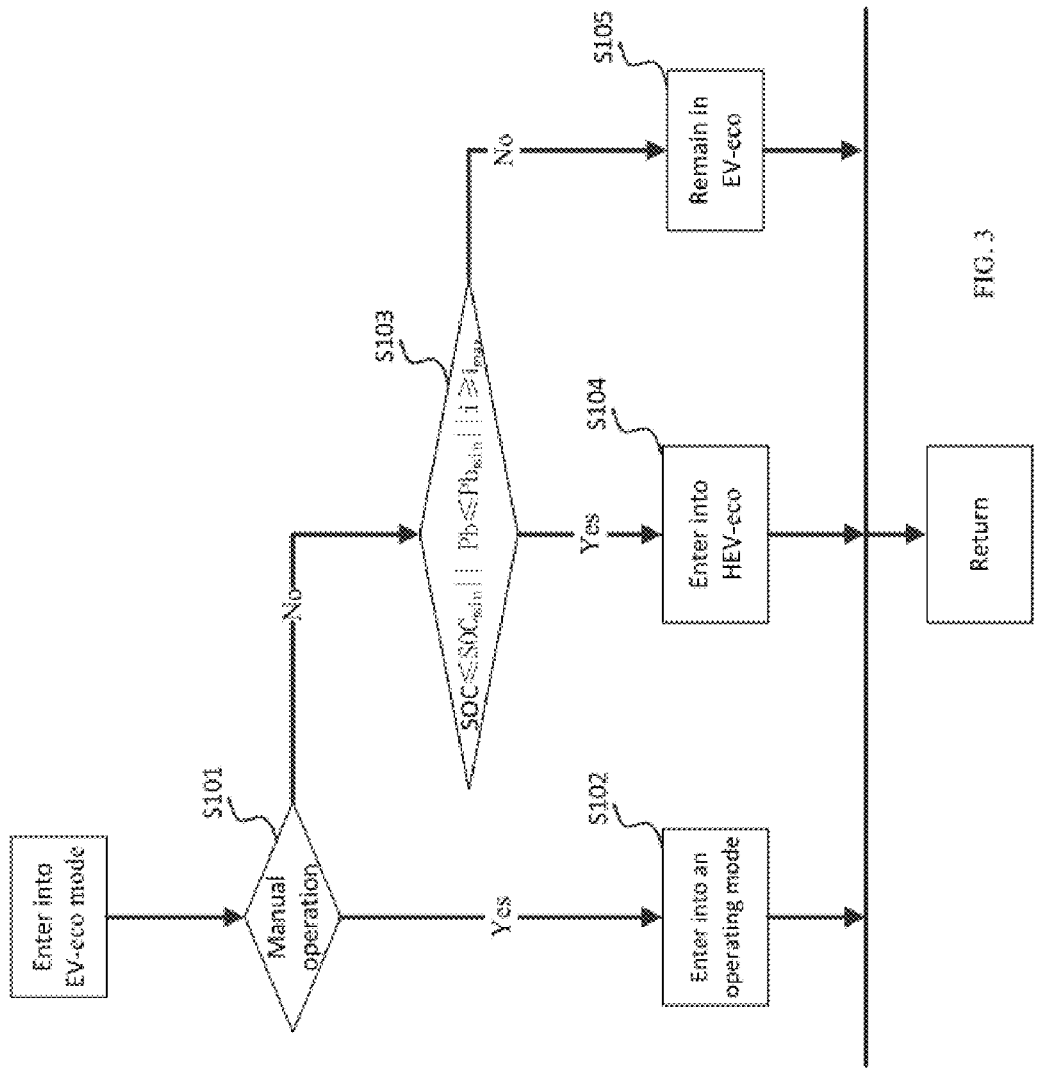
FIG. 3 is a flow chart illustrating a control method when hybrid electric vehicle is in EV-eco mode in accordance with some example embodiments.

FIG. 3 is a flow chart illustrating a control method when hybrid electric vehicle operates in EV-eco mode in accordance with some example embodiments. As shown in FIG. 3, when the hybrid electric vehicle operates in EV-eco mode, if it is determined that the electric quantity (SOC) of the power battery is below a lower limit of SOC of the power battery $SOC_{min}$, e.g., 20%, or the maximum allowable discharge power of the power battery Pb is below a lower limit of the allowable discharge power of the power battery $Pb_{min}$, e.g., 12 KW, or the current slope exceeds an upper limit of the slope, e.g., 15%. The control module 40 is configured to enable the vehicle to enter into HEV-eco mode.

In this embodiment, as shown in FIG. 3, when the hybrid electric vehicle operates in EV-eco mode and operator does not manually select another driving mode, the vehicle is driven by the battery-powered motor while the engine is kept off. If operator manually selects HEV mode, the hybrid electric vehicle enters into HEV-eco mode. Alternatively, if operator manually selects sport mode, the vehicle enters into EV-s mode. If no manual mode selection operation is performed, and the electric quantity of the power battery is below a lower limit of SOC of the power battery $SOC_{min}$, e.g., 20%, or the maximum allowable discharge power of the power battery Pb is below a lower limit of the allowable discharge power of the power battery $Pb_{min}$, e.g., 12 KW, or the current slope exceeds an upper limit of the slope, e.g., 15%, the control module 40 is configured to switch the operating mode to HEV-eco mode. If the vehicle operates in EV-eco mode, in order to improve the efficiency of power to allow the vehicle to drive extended distances, the electric motor may not be allowed to produce its maximum allowable power. The acceleration performance is taken into account in this mode. The electric motor may be capable of producing its maximum allowable torque. In other words, when the hybrid electric vehicle operates in EV-eco mode, the control module 40 is configured to restrict the allowable output power of the electric motor 5.

Figure 4:
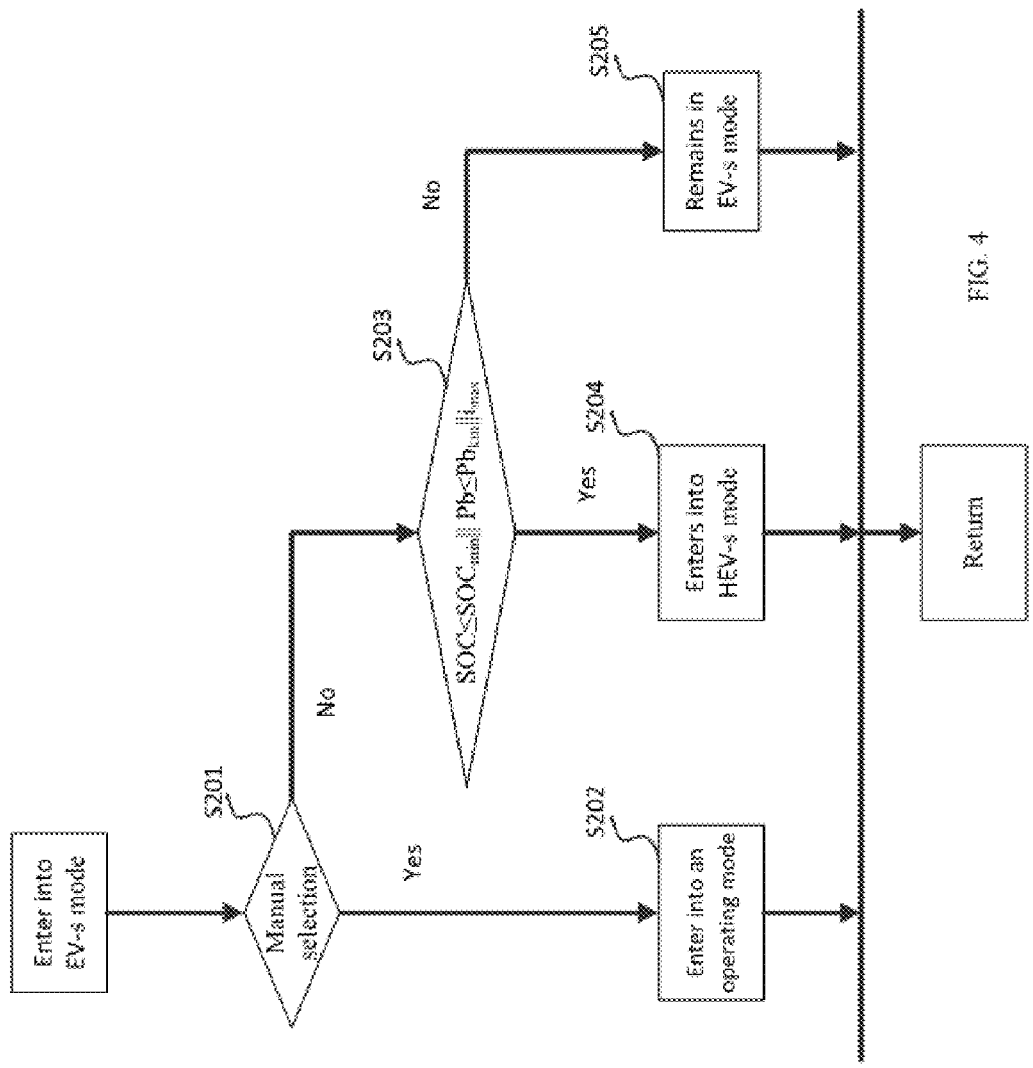
FIG. 4 is a flow chart illustrating a control method when hybrid electric vehicle is in EV-sport mode in accordance with some example embodiments.

FIG. 4 is a flow chart illustrating a control method when a hybrid electric vehicle operates in EV-s mode in accordance with some example embodiments. As shown in FIG. 4, when the hybrid electric vehicle operates in EV-s mode, if it is determined that the SOC of the power battery is below the lower limit of the SOC of the power battery $SOC_{min}$, e.g., 20%, or the maximum allowable discharge power of the power battery Pb is below the lower limit of the allowable discharge power of the power battery $Pb_{min}$, e.g., 12 KW, or the slope i exceeds upper limit of the slope $i_{max}$, e.g., 15%, the control module 40 is configured to enter into HEV-s mode.

As shown in FIG. 4, when the hybrid electric vehicle operates in EV-s mode and the operator does not manually select another operating mode, the vehicle is driven by the electric motor-powered by the power battery while the engine is kept off. When the operator manually selects HEV mode, the operating mode is switched to HEV-s mode. When operator manually selects the eco mode, the operating mode is switched to EV-eco mode. When no manual mode selection is performed, the SOC of the power battery is below the lower limit of the SOC of the power battery $SOC_{min}$, e.g., 20%, or the maximum allowable discharge power of the battery Pb is below the lower limit of the allowable discharge power of the battery $Pb_{min}$, e.g., 12 KW, or the slope i exceeds upper limit of the slope $i_{max}$, e.g., 15%, the control module 40 is configured to control the vehicle to switch to HEV-s mode. When the hybrid electric vehicle operates in EV-s mode, the control method prioritizes dynamic performance. Accordingly, the output power of the electric motor is not restricted.

With references to FIG. 3 and FIG. 4, when the hybrid electric vehicle operates in EV-eco mode or EV-s mode, if receiving a mode switch request of the operator or triggering a mode switch function so as to switch between different operating modes, the control module 40 is configured to switch to a target mode in response to the request of the operator.

In this embodiment, by selecting the EV mode and selecting the driving mode between economy mode and sport mode, the vehicle operates in EV-eco mode or EV-s mode. Because hybrid electric vehicles can employ a plug-in battery charging structure, the battery capacity is therefore increased. By using a high-power and high-torque electric motor, the hybrid electric vehicle can work in a more powerful manner in EV mode, thus being capable of dealing with all city road conditions and most suburban road conditions without triggering automatic mode switch function. Only when the slope exceeds the upper limit of the slope $i_{max}$, e.g., 15% (the maximum slope value in EV mode), the mode is automatically switched to the HEV mode. For instance, unless the operator manually selects other work mode, the work mode is remained in HEV mode. In EV-eco mode, the electric motor may not deliver its maximum power but may produce maximum torque. In this mode, performance of hill climbing at low speeds and high efficiency at high speeds are obtained. In EV-s mode, the electric motor may produce its maximum power and maximum torque, which may provide the strongest horsepower in the EV mode. EV mode prioritizes dynamic performance and allows the vehicle to drive extended distances by avoiding high power consumption resulting from long time use of the battery to improve electricity usage efficiency and at the same time ensure the vehicle to operate in a good manner under one of the below conditions: the SOC of the battery is low, the maximum allowable discharge power of the battery is not sufficient, and the slope is steep. As a result, dynamic performance may not be decreased due to certain factors. At the same time, only one mode transition is automatically executed which may avoid frequent engine start/stop, thus improving the life of the starter, reducing noise, and improving driving comfort.

Figure 5:
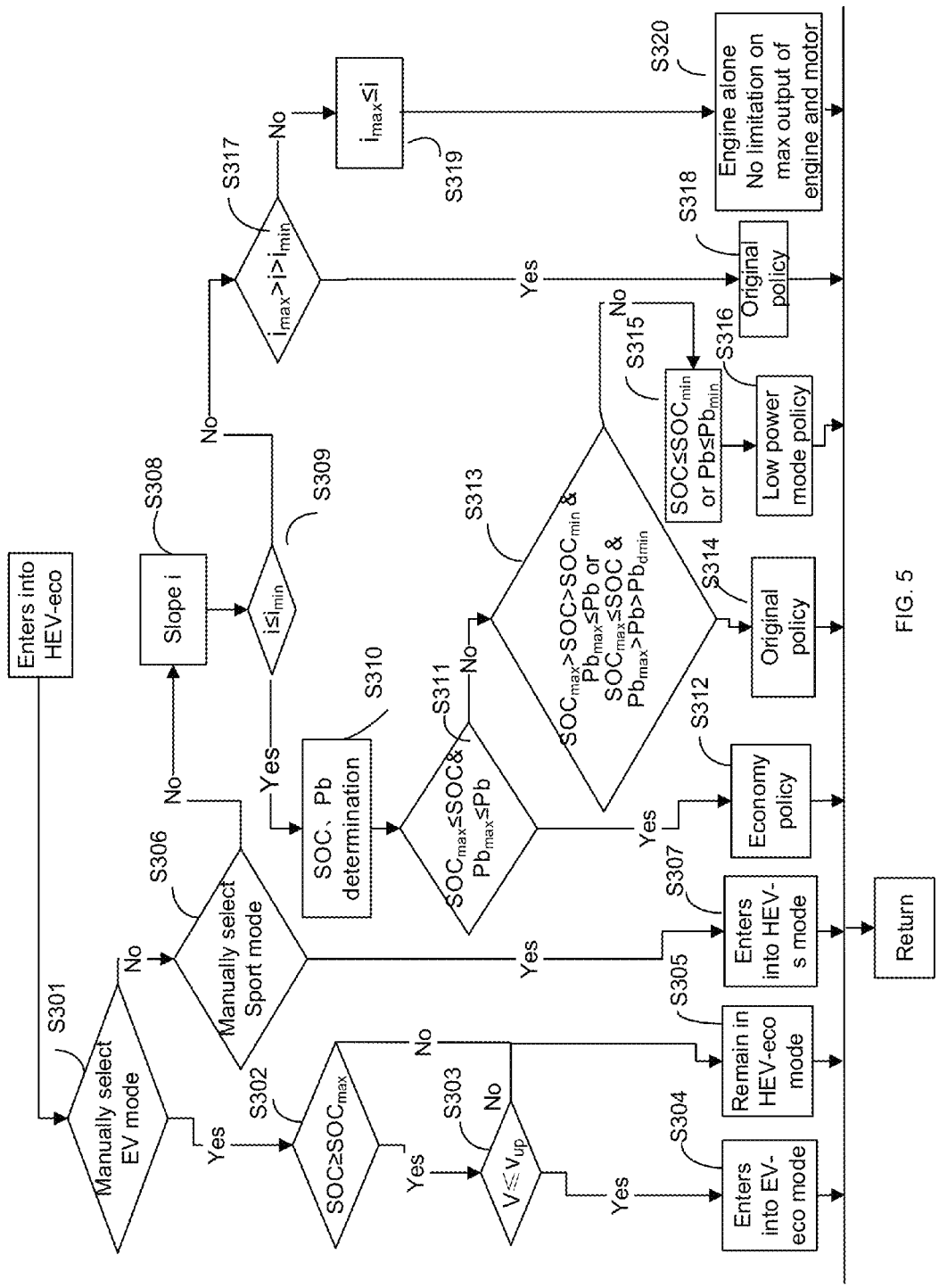
FIG. 5 is a flow chart illustrating a control method when hybrid electric vehicle is in HEV-eco mode in accordance with some example embodiments.

FIG. 5 is a flow chart illustrating a control method when a hybrid electric vehicle operates in HEV-eco mode in accordance with some example embodiments. As shown in FIG. 5, when the hybrid electric vehicle operates in HEV-eco mode, the control module is configured to receive a request to select EV-eco mode. If the control module determines that the SOC exceeds the upper limit of the electric quantity $SOC_{max}$, e.g., 30% and the vehicle speed V is below the maximum speed $V_{max}$, e.g., 150 km/h, the control module is configured to switch the operating mode to EV-eco mode.

When the hybrid electric vehicle operates in HEV-eco mode, under the conditions that the slope i is below or equal to the lower limit of the slope $i_{min}$, e.g., 5%, the SOC is above or equal to the upper limit of the electric quantity $SOC_{max}$, e.g., 30%, and the maximum allowable discharge power of the battery Pb is above or equal to the upper limit of the allowable discharge power of the battery $Pb_{max}$, e.g., 30 KW, the vehicle employs economy strategy in operation. Under the conditions that the slope i is below or equal to the lower limit the slope $i_{min}$, e.g., 5%, the SOC is below or equal to the lower limit of the electric quantity $SOC_{min}$, e.g., 20%, or under the conditions that the slope is below or equal to the lower limit of the slope $i_{min}$, e.g., 5%, and the maximum allowable discharge power of the battery Pb is below or equal to the lower limit of the maximum allowable discharge power of the battery $Pb_{min}$, e.g., 12 KW, the vehicle operates in the low power manner. In this embodiment, the upper limit of the electric quantity $SOC_{max}$ is set greater than the lower limit of the electric quantity $SOC_{min}$. The upper limit of the maximum allowable discharge power of the battery $Pb_{max}$ is greater than the lower limit of the maximum allowable discharge power of the battery $Pb_{min}$. In this embodiment, the low power manner means that the engine drives the motor to generate power quickly, thus getting the motor out of the low power manner. The motor is enabled to adjust the operation range of the engine to ensure economic operation of the vehicle.

Figure 6:
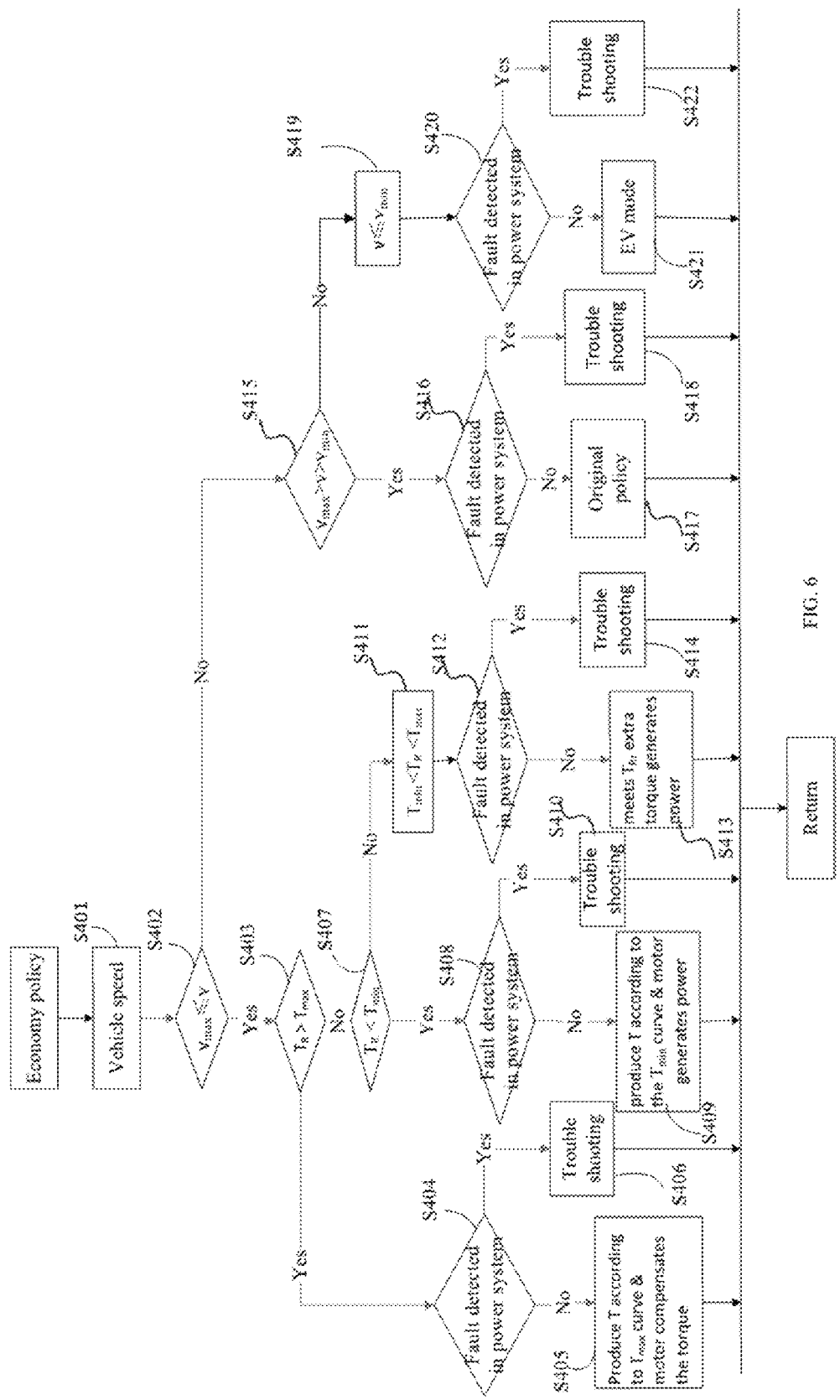
FIG. 6 is a flow chart illustrating a control method when hybrid electric vehicle is in EV-eco mode and operates by economy strategy in accordance with some example embodiments.
Figure 7:
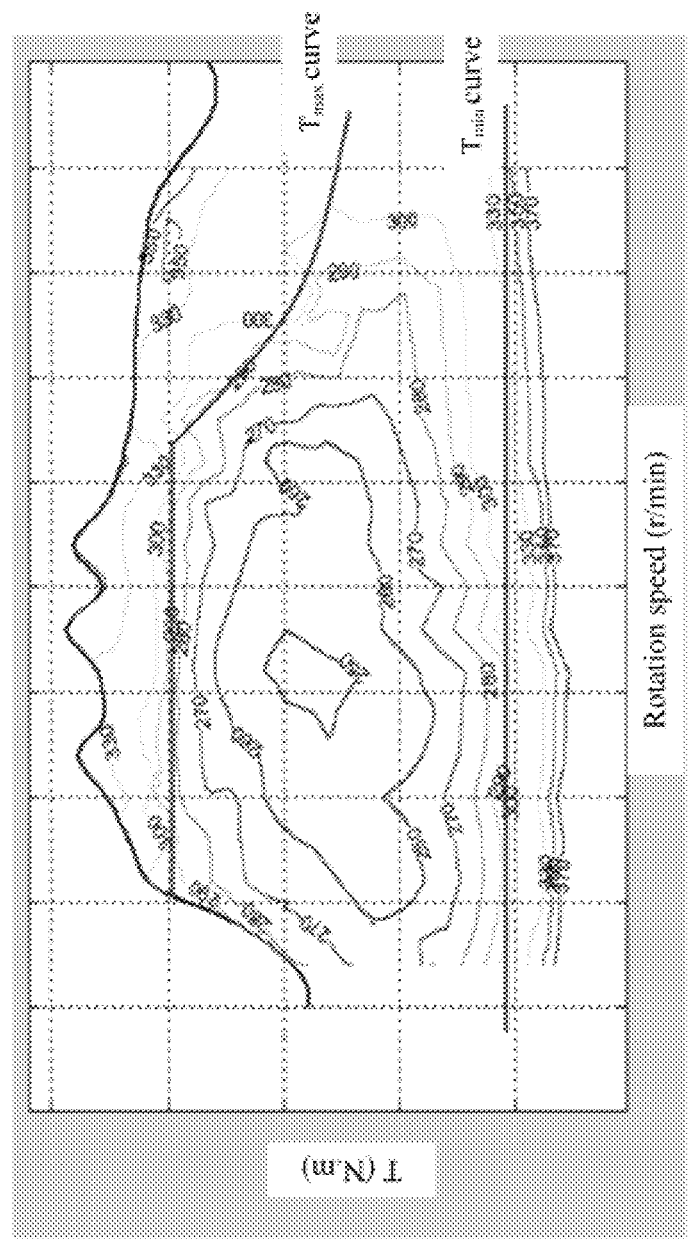
FIG. 7 illustrates a schematic of engine operating area when hybrid electric vehicle is in HEV-eco mode in accordance with some example embodiments.
Figure 8:
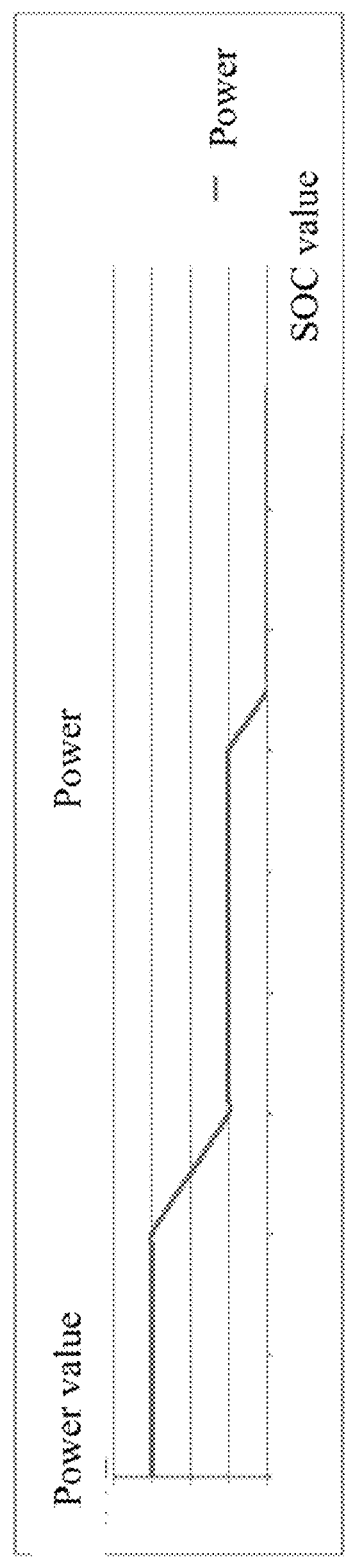
FIG. 8 illustrates a relationship between motor power curve and battery state of charge (SOC) in accordance with some example embodiments.

FIG. 6 is a flow chart illustrating a control method when a hybrid electric vehicle operates in EV-eco mode by economy manner in accordance with some example embodiments. When the hybrid electric vehicle operates in economy mode, if the vehicle speed V is below the lower limit of the speed $V_{min}$, e.g., 15 km/h, the control module is configured to enable the hybrid electric vehicle to operate in EV mode. In this mode, under the conditions that the vehicle speed exceeds a upper limit of the speed, e.g., 30 km/h and provided vehicle's torque requisition $T_R$ (torque required to maintain the current vehicle speed) exceeds the maximum torque $T_{max}$ (upper limit of the torque) permitted from the engine, such as beyond maximum torque curve, the control module is configured to control the engine to output torque according to a preset maximum torque curve and enable the electric motor to produce compensation torque. When the torque requisition $T_R$ is less than the minimum torque $T_{min}$ (lower limit of the torque) produced by the engine, such as under minimum torque curve, the control module is configured to control the engine to output torque according to a preset minimum torque curve and produce power. When the torque requisition $T_R$ does not exceed the maximum torque $T_{max}$ permitted from the engine and exceeds the minimum torque $T_{min}$ produced by the engine, namely, under the preset maximum engine torque curve and beyond the preset minimum engine torque curve, the motor control device is configured to control the engine to produce torque to meet torque requisition and supply power to the electric motor. In this embodiment, the preset maximum torque curve and preset minimum torque curve are shown in FIG. 7. When the vehicle torque requisition $T_R$ is between the maximum torque curve and minimum torque curve, relationship between quantity of electric charge SOC and motor power is shown in FIG. 8.

Figure 9:
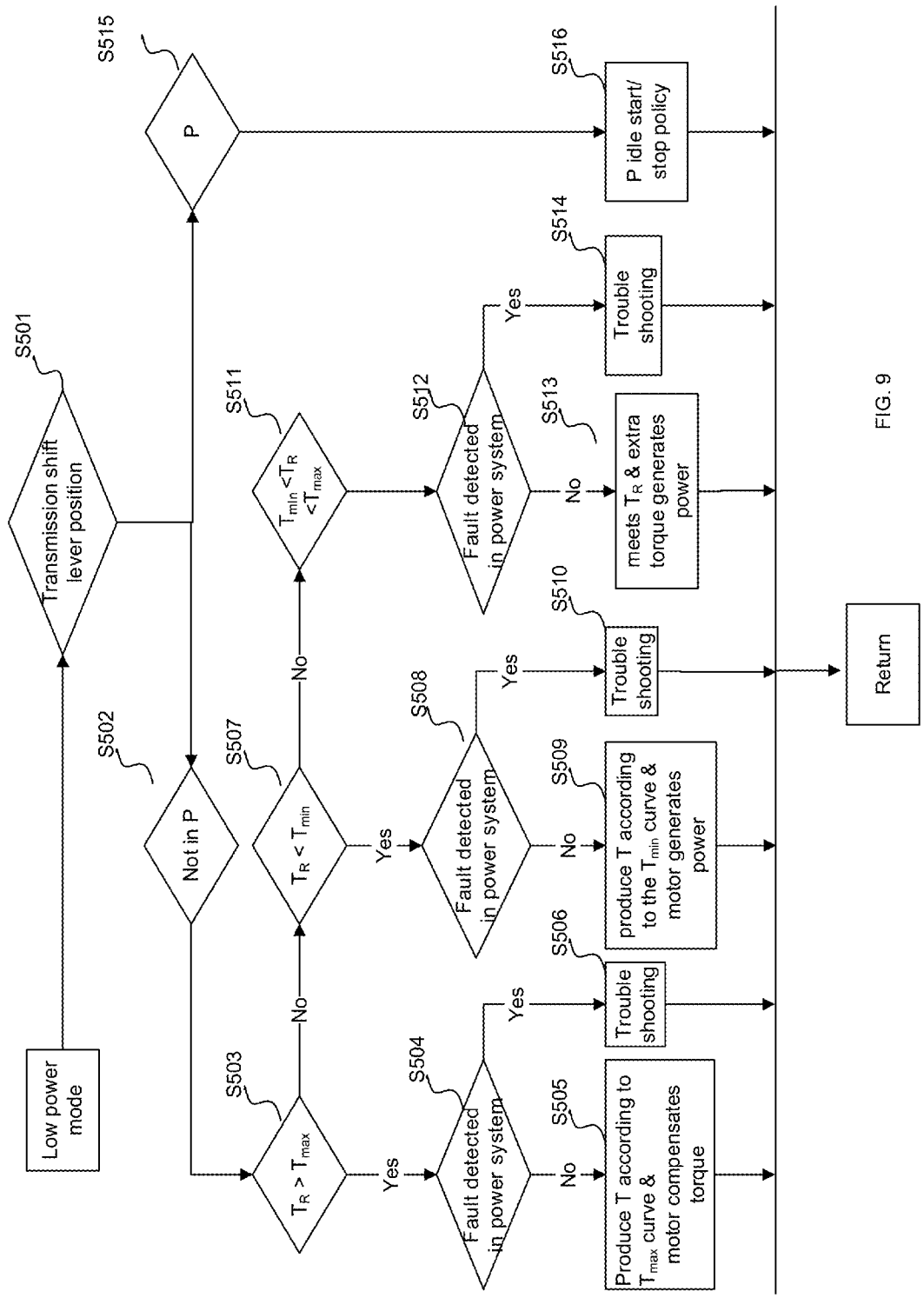
FIG. 9 is a flow chart illustrating a control method when the hybrid electric vehicle is in HEV-eco mode and operates in a low power manner in accordance with some example embodiments.

FIG. 9 is a flow chart illustrating a control method when a hybrid electric vehicle operates in HEV-eco mode by low power manner in accordance with some example embodiments. When the hybrid electric vehicle is running by the low power manner and the transmission shift lever is not in park P and when the torque requisition $T_R$ exceeds the maximum torque $T_{max}$ permitted from the engine, such as beyond the maximum torque curve, the control module is configured to control the engine to output torque according to the maximum torque curve and enable the electric motor to produce compensation torque. When the torque requisition $T_R$ is less than the minimum torque $T_{min}$ produced by the engine, such as under the minimum torque curve, the control module is configured to control the engine to output torque according to the minimum torque curve and produce power. When the torque requisition $T_R$ does not exceed the maximum torque $T_{max}$ permitted from the engine and exceeds the minimum torque $T_{min}$ produced by the engine, namely, under the maximum torque curve and beyond the minimum torque curve, the motor control device is configured to control the engine to output torque to meet torque requisition and control the motor to produce power. By contrast, when the hybrid electric vehicle operates in low power manner and the transmission shift lever is in park P, the control module is configured to enable the hybrid electric vehicle to operate by idle start-stop strategy. When the hybrid electric vehicle enters to operate by idle start-stop strategy, the control module also determines whether the hybrid electric vehicle idle start-stop conditions are satisfied. When the control module determines that the hybrid electric vehicle satisfies the idle start-stop conditions, such as vehicle speed is zero, transmission shift lever is in park P, and quantity of electric charge SOC is greater than 20%, the control module is configured to shut down the engine power subsystem.

In the embodiment illustrated in FIG. 5, when the hybrid electric vehicle operates in HEV-eco mode, when operator manually selects EV button, only when quantity of electric charge SOC is below the upper limit of quantity of electric charge $SOC_{max}$, e.g., 30% and the vehicle speed V is below the maximum speed $V_{max}$, e.g., 150 km/h, the operator is allowed to select EV-eco mode. Otherwise, the operating mode remains the same. When operator manually selects sport mode, the operating mode is switched to HEV-s mode. When no manual mode selection is executed, the operating mode remains in HEV-eco mode. Whether the engine and the motor operate in economy manner or low power manner depends on the SOC of the battery as well as the maximum allowable discharge power of the battery. As shown in FIG. 6, to implement economy manner, when the vehicle speed does not exceed 15 km/h, the control module is configured to enable the hybrid electric vehicle to operate in EV mode. When the vehicle speed exceeds 30 km/h, the engine starts to drive the vehicle. The vehicle is enabled to enter into EV mode when the speed is reduced to 15 km/h. In this manner, if the electric motor does not produce sufficient power to drive the vehicle, the engine may start to produce power. As shown in FIG. 9, the vehicle is disabled to work in EV mode at low speeds but is enabled to work by low power manner. The control module is configured to enable the idle start-stop function when transmission shift lever is in park P. In other words, by low power manner, when the SOC is below a certain level (for example 20%) the motor supplements the power of the engine. The engine works in economy manner and at the same time provides power to the motor. By low power manner, when the electric power of the vehicle is on and the transmission shift lever is not in park P, the engine is kept running. Under the conditions that the vehicle speed V is zero, the transmission shift lever is in park P, and the SOC exceeds 20%, the engine operates by idle start-stop strategy. The engine is shut off. By low power manner, the EV mode is not available for operation and the engine is running to drive the vehicle. By low power manner, the engine employs the same control method as in the economy manner. The maximum torque curve and the minimum torque curve of the engine are shown in FIG. 7. It desires to include the largest fuel economic area between the maximum torque curve and minimum torque curve. In the area that is outside the fuel economic area, the electric motor supplements the engine's power to drive the load. When the load is small, the engine may produce torque in accordance with minimum engine torque curve. Extra torque produced by the engine may be used to supply power to the electric motor. When the load is large, the engine may produce the torque in accordance with maximum engine torque curve. The electric motor may produce torque and compensate the torque. If charge or discharge capacity is restricted by characteristics of the electric motor or the battery, the electric motor may charge or discharge the battery according to its maximum capacity. Under this condition, the operation of the engine may not be restricted by the upper and lower limits of the engine torque and may output desired torque to meet the needs of the vehicle. When the output torque value of the engine is between the maximum torque curve and minimum torque curve, the electric motor produces power. The torque produced by the engine does not exceed the upper limit of the torque. Power value and SOC value compose a function, as shown in FIG. 8. When an engine operates in the area between the maximum torque curve and the minimum torque curve, if charge capacity is restricted by characteristics of the electric motor or the battery, the electric motor may fully charge the battery. In the above-described operation in HEV-eco mode, the slope i does not exceed the upper limit $i_{max}$, e.g., 15%. When the slope i exceeds the upper limit $i_{max}$, i.e., 15%, the engine is started to meet the hill-climbing performance. No limitation is imposed on the upper limit and the lower limit of the power produced by the engine and the electric motor. Until the slope is less than the lower limit of the slope $i_{min}$, e.g., 5%, the original operating mode, such as HEV-eco mode, is executed.

In an embodiment of the present invention, the structure of the control system comprises an engine and an electric motor. The engine and the electric motor are connected in parallel through a dual-clutch transmission. In contrast, the traditional transmission system may comprise engines, MG1 and MG2 connected in series-parallel through a planetary gear set. When conditions of idle start-stop function are met, the power requisition of vehicle is not taken into account. When slope of the road is below a certain value, when to start or stop the engine only depends on vehicle speed. Vehicle speed that determines transitions between different operating modes is relatively high. When the slope of the road exceeds a certain value, both vehicle speed and slope are taken into account. The engine is running. In contrast, in the traditional transmission system, the control method depends on vehicle speed and the battery charge or discharge power requisition, and power requisition. Vehicle speed that determines transitions between different operating modes is relatively low. By the low power manner, when the quantity of electric charge SOC is less than 20%, the engine may operate by low power manner. In contrast, in the traditional transmission system, the lower limit of the quantity of electric charge SOC that determines whether to operate by low power manner is 45% or less. When the control system operates by idle start-stop strategy, so long as the vehicle speed is zero, the transmission shift lever is in park P, and the SOC exceeds 20%, the engine is shut off. In contrast, in the traditional transmission system, water temperature of the engine is also considered to determine whether to shut off the engine. The SOC in the traditional transmission system is set at a relatively high value. In exemplary embodiments of present invention, whether the control system of the hybrid electric vehicle operates by either economy manner or the low power manner depends on various factors, rather than keeping the amount of electric charge balance. In contrast, in traditional system, the SOC enters into equilibrium state after transmission system is running for a short period of time. Different configuration of the engine and the electric motor results in different control methods. In traditional system, rotation speed of the engine is adjusted by adjusting the rotation speed of MG1. The idle speed of the engine is up to 1200 rpm. In embodiments of the present invention, the idle speed of the engine is about 800 rpm. The control system is configured to control six shift levers of the double-clutch. Shift operation is relatively simple. In embodiments of the present invention, either all of the power produced by the engine is used to drive the load or part of the power produced by the engine is used to drive the load and part of the power produced by the engine supplies to the battery. In the traditional system, when the load is large, part of the power produced by engine is provided to MG1 to generate power which is then provided to MG2 to drive the vehicle.

Therefore, in traditional system, due to the limited capacity of the battery and the engine, both the power required to start or stop the engine and the vehicle speed shifted between different operating modes are set relatively low, which result in early and frequent ignition. More use of the engine increases fuel consumption and emissions in urban conditions. In contrast, in embodiments of the present invention, the control system of the hybrid electric vehicle has a strong driving capacity in EV mode which can meet the needs of vast majority of drivers. Threshold values that determine whether the engine starts or stops are set relatively high. An engine may be used less in driving, which may reduce fuel consumption and emissions in urban conditions. An operation of the user on throttle may reflect more power demand, which may avoid determining the power requisition of the entire vehicle, thereby reducing frequent start/stop of the engine, extending life of the motor, reducing noise, and improving comfort. At the same time, acceleration at wide-open throttle may be reduced. During hill-climbing, the movement of the vehicle may result in less impact, thus improving driving safety and comfort. In contrast, in traditional technology, when transmission shift lever is in park P, the SOC and water temperature of the engine are taken into account to determine whether to start or stop the engine. Because these factors are not controlled by an operator, it is hard to summarize operation rules. Small battery capacity may result in relatively large SOC value, which may cause the engine idle when the vehicle stops at stoplights despite the transmission shift lever is in park P. This may increase parking noise and reduce comfort. The idle speed of the engine may be up to 1200 rpm. It may result in louder engine noise and higher fuel consumption than ordinary fuel vehicles. In most cases of embodiments of the present invention, the control system may turn off the engine when the transmission shift lever is in park P, which may help operators to summarize operation rules, thus reducing the noise when vehicle stops and increasing comfort during parking. The idle speed of the engine in embodiments of the present invention is similar to traditional vehicles powered by internal combustion engine. In addition, no balancing is made on the quantity of electric charge in the control system of the present invention. The vehicle will automatically switch between economy strategy and low power strategy based on the actual working conditions which may highlight electric motor's capability of adjusting the operating area in which the engine operates. This may further help to reduce fuel consumption and emissions. In embodiments of the present invention, structure of the dual clutch transmission employed by the transmission system is simple which may improve transmission match rate, thereby reducing the cost. Due to employment of the series-parallel configuration, the control strategy employed by the engine and the control strategy employed by the motor may work in more efficient way. As a result, power conversion efficiency is improved. Finally, in embodiments of the present invention, the power generation strategy is to dynamically associate the engine with the SOC so that the vehicle can maintain a high quantity of electric charge when the vehicle is driven in normal status with medium or low load.

Figure 10:
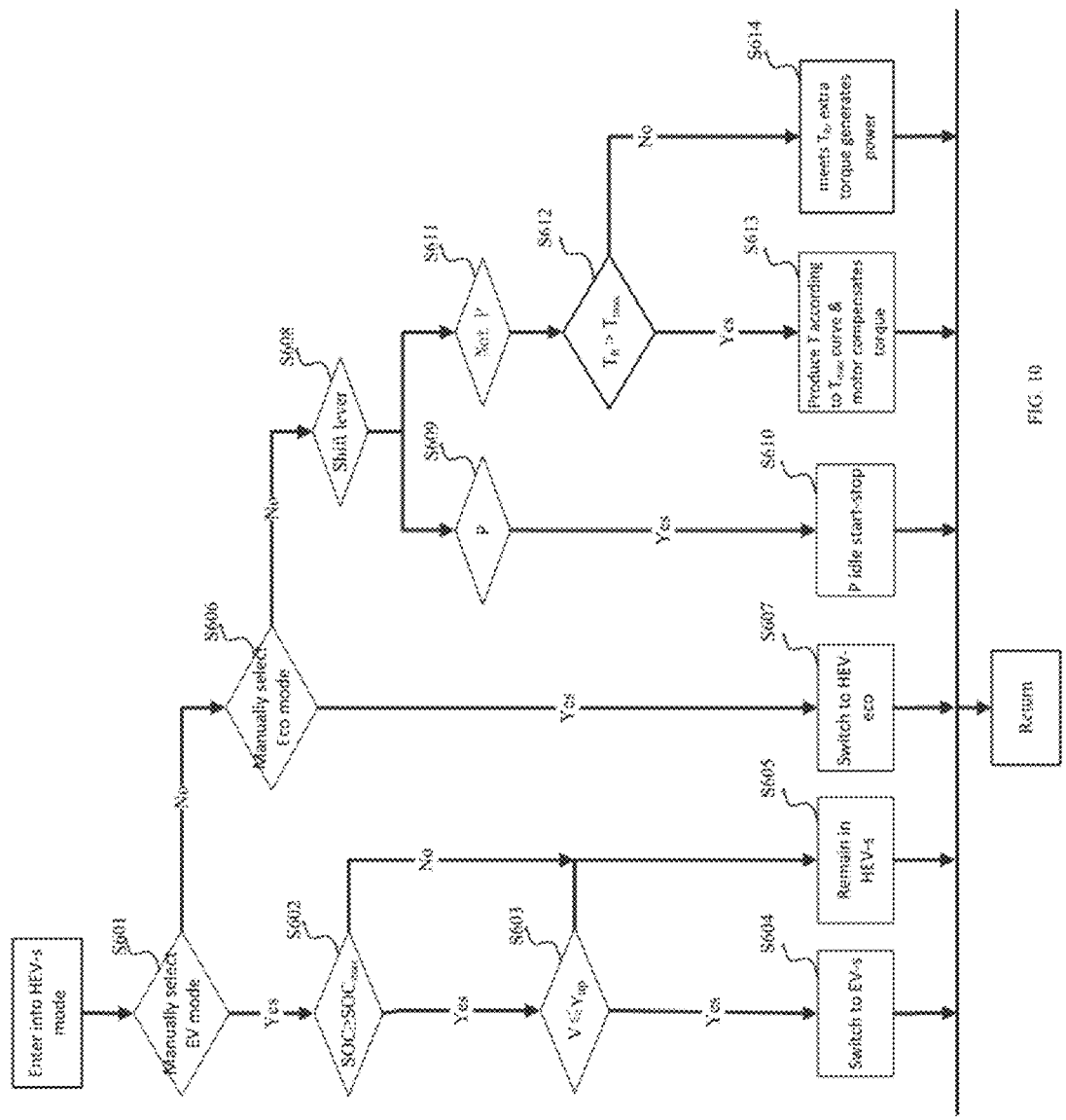
FIG. 10 is a flow chart illustrating a control method when the hybrid electric vehicle is in HEV-sport mode in accordance with some example embodiments.

In yet another embodiment of the present invention, as shown in FIG. 10, when the hybrid electric vehicle operates in HEV-s mode, upon receipt of a signal indicative of switching the operating mode to EV-s mode, under conditions that if it is determined the SOC exceeds the upper limit of the electric quantity $SOC_{max}$, e.g., 30%, and the current vehicle speed V is below the maximum speed $V_{up}$, e.g., 150 km/h, the control module is configured to switch the operating mode to EV-s mode.

Further, when the hybrid electric vehicle operates in HEV-s mode, if the current transmission shift lever is in park P, the control module is configured to operate by idle start-stop strategy. Otherwise, if the current transmission shift lever is not in park P, when the torque requisition $T_R$ exceeds a peak torque (maximum torque $T_{max}$) of the engine, the control module is configured to control the engine to produce torque in accordance with the peak torque and enable the motor to compensate the torque. When the torque requisition $T_R$ is below the peak engine torque $T_{max}$, the control module is configured to control the engine to produce torque to meet vehicle requisition and enable the motor to generate power.

FIG. 10 is a flow chart illustrating a control method when the hybrid electric vehicle operates in HEV-s mode in accordance with some example embodiments. When the hybrid electric vehicle operates in HEV-s mode, when operator manually selects EV mode, only under conditions that the SOC exceeds the upper limit of the electric quantity $SOC_{max}$, e.g., 30%, and the vehicle speed V is below the maximum speed $V_{up}$, e.g., 150 km/h, the control module is configured to select the EV-s mode. When no mode selection is manually executed, the operating mode remains in HEV-s mode. Operation strategy in HEV-s mode is similar to that in HEV-eco mode with employment of the low power manner. No restriction is imposed on upper and lower limit of the power produced by the electric motor and the torque produced by the engine. The electric motor can produce its maximum power. Engine can produce its maximum torque. The best dynamic performance can be obtained by idle start-stop strategy.

In an embodiment of the present invention, when the engine starts, double-clutch transmission transfers power produced by engine and executes the transmission shift operation. When the vehicle is in HEV-eco mode or the HEV-s mode, each mode is associated with a particular transmission shift strategy. Control strategy implemented by HEV-eco mode is to reduce fuel consumption. Thus, transmission shift strategy implemented in HEV-eco mode is to enable the engine to work more efficiently and each transmission shift is executed earlier than predicted. The rotation speed of engine is usually within range of 1500~2000 rpm. By contrast, control strategy implemented by HEV-s mode is to improve dynamic performance. Thus the transmission shift strategy implemented by HEV-s mode is to transfer as large as possible torque produced by the engine to the wheels thus obtaining better driving performance. The transmission shift is executed later than predicted. When rapid acceleration is made at fully open throttle, transmission shift is executed using the largest torque produced by the engine regardless of the current gear to increase acceleration performance.

FIGS. 11-14 illustrates methods of controlling idle start-stop function in accordance with some example embodiments.

As shown in FIG. 13, when the hybrid electric vehicle operates by idle start-stop strategy and the engine is running, when all of the following conditions are satisfied, the engine is shut off by the control module 40:

(1) no fault is detected in high-pressure system;
(2) no fault is detected in communication system;
(3) transmission shift lever is in park P;
(4) maximum allowable discharge power of the battery Pb in the motor power subsystem exceeds the upper limit of the maximum allowable discharge power of the battery $Pb_{max}$; and
(5) water temperature at the engine thermostat Temp is greater than the upper limit of preset temperature $Temp_{max}$.

In other words, whether to operate by idle start-stop strategy is determined by conditions including power mode, operating mode or work mode, slope of the road, and vehicle speed. When all conditions are met, the idle start-stop strategy is enabled. The vehicle may operate by idle start-stop strategy accordingly. When any condition of the idle start-stop conditions is not met, the idle start-stop strategy is disabled. When the idle start-stop function is disabled, even all idle start-stop conditions are met, the engine will not execute idle start-stop strategy.

The idle start-stop conditions are determined by fault detection result of both the high pressure system and the communication system, the enablement status of idle start-stop strategy, transmission gearshift position, the maximum allowable discharge power, and the water temperature at engine thermostat. When the idle start-stop strategy is enabled, if the above conditions are met, the engine is shut off.

As shown in FIG. 14, when the hybrid electric vehicle operates by idle start-stop strategy and the engine turns off, when any of the following conditions is satisfied, the engine is turned on by the control module:

(1) fault has been detected in high-pressure system;
(2) fault has been detected in communication system;
(3) transmission shift lever is not in park P;
(4) maximum allowable discharge power of the battery Pb is below the lower limit of the maximum allowable discharge power of the battery $Pb_{min}$; and
(5) water temperature at engine thermostat Temp is less than the lower limit of the preset temperature $Temp_{min}$.

In other words, whether to operate by idle start-stop strategy is determined by conditions including fault detection result of high-pressure system and communication system, transmission shift lever position, maximum allowable discharge power by battery, and water temperature at engine thermostat. When the idle start-stop strategy is enabled, if any above condition is met, the engine will execute idle start-stop strategy.

In the control system in accordance with embodiments of the present invention, compared to the series configuration employed by the power system on existing hybrid electric vehicle, the parallel configuration employed by the engine power subsystem and the motor power subsystem improves the energy efficiency. Since the parallel configuration is simpler than series-parallel configuration, complex compatibility with ECVT is avoided. Smooth operation between different operating modes and economy performance are improved without sacrificing dynamic performance. The idle start-stop strategy may reduce the fuel emissions and frequent starts and stops which may help to extend the life of the motor. The engine idle start-stop strategy is disabled when power supply is abnormal to ensure the power supply to the electrical equipment.

In embodiments of the present invention, when the hybrid electric vehicle operates in EV-eco mode, the upper limit of the power produced by the battery is less than a first preset power. When the hybrid electric vehicle operates in EV-s mode, the upper limit of the power produced by the battery is less than a second preset power. The second preset power is greater than the first preset power. When the hybrid electric vehicle operates in the HEV-eco mode, both the upper limits of the power produced by the battery and the engine are less than the first preset power. The upper limit of the torque produced by the engine is less than a preset torque. When the hybrid electric vehicle operates in the HEV-s mode the upper limit of the power produced by the battery is less than the second preset power. The engine is allowed to produce power in accordance with the maximum power curve. The engine is allowed to produce torque in accordance with the maximum torque curve. In one example of the present invention, the first preset power may be 70 KW. The second preset power may be 110 KW. The preset torque value may be 185N·M.

In other words, the EV-eco mode means that when hybrid electric vehicle operates in EV mode, the upper limit of the power produced by the battery is less than the upper limit of the power in economy mode, such as 70 KW. In this mode, the battery may work in the most fuel economic area. The EV-s mode means that the power produced by the battery is less than the upper limit of the power produced in sport mode, e.g., 110 KW. In HEV-eco mode, the upper limit of the power produced by the battery is less than the upper limit of the power produced in the economy mode, e.g., 70 KW. The upper limit of the torque produced by the engine is less than the upper limit torque produced in the economy mode, e.g., 185N·M. The engine and battery both operate in the most fuel economic area. In HEV-s mode, the upper limit of the power produced by the battery is less than the upper limit of the power produced by the battery in sport mode, e.g., 110 KW. The engine is allowed to produce the power in accordance with the maximum power curve. The engine is allowed to produce torque in accordance with the maximum torque curve.

In the embodiments of the present invention, the most fuel economic area in EV mode means that with the increase of the power discharged by the battery, battery efficiency is decreased. As a result, while dynamic performance (operational performance and acceleration performance) is ensured, the battery is configured to work at lower power discharge rate. The most fuel economic area are determined by torque and rotation speed of the engine. As shown in FIG. 7, the x-axis indicates the engine rotation speed. The y-axis represents the engine torque. FIG. 7 shows that at different rotation speeds the most economic operating area can be achieved with an appropriate torque chosen. If the engine torque is too high, engine torque is decreased and the torque is compensated by the motor. If the engine torque is too low, the engine torque is increased. The vehicle does not need to use the increased engine torque to drive. The increased torque can be stored and reused by the motor to produce power.

Moreover, the upper limit of the power in economy manner means the upper limit of the power produced by the engine or the motor while they work within the fuel economic area. In sport mode, the upper limit of the power of the battery, motor, and the engine are set in accordance with the maximum power that can be produced. The engine produces torque or power in accordance with the maximum torque or the maximum power. The battery produces power in accordance with the maximum power. In this manner, the power system delivers maximum power or torque to the vehicle.

In addition, it is understood that when the engine restarts, the operating mode remains the same as that before the engine is shut off. The hybrid electric vehicle further comprises a fuel-only mode. The fuel-only mode is an abnormal operating mode.

In the control system in accordance with embodiments of the present invention, compared to the series configuration employed by the power system on existing hybrid electric vehicle, the parallel configuration employed by the engine power subsystem and the motor power subsystem improves the energy efficiency. Since the parallel configuration is simpler than series-parallel configuration, complex operation employed in series-parallel configuration to switch between modes is avoided. Smooth operation between different operating modes and economy performance are improved without sacrificing dynamic performance. The idle start-stop strategy may reduce the fuel emissions and frequent starts and stops which may help to extend the life of the motor, reduce noise and improve driving comfort. The power requisition is set at relatively high. Engine may be used less in driving which may reduce fuel consumption and emissions in urban conditions.

FIGS. 3-14 further describe control methods according to the present invention. The hybrid electric vehicle comprises a transmission system, an engine power subsystem and motor power subsystem. The transmission system is coupled with the engine power subsystem and the motor power subsystem, respectively.

Figure 11:
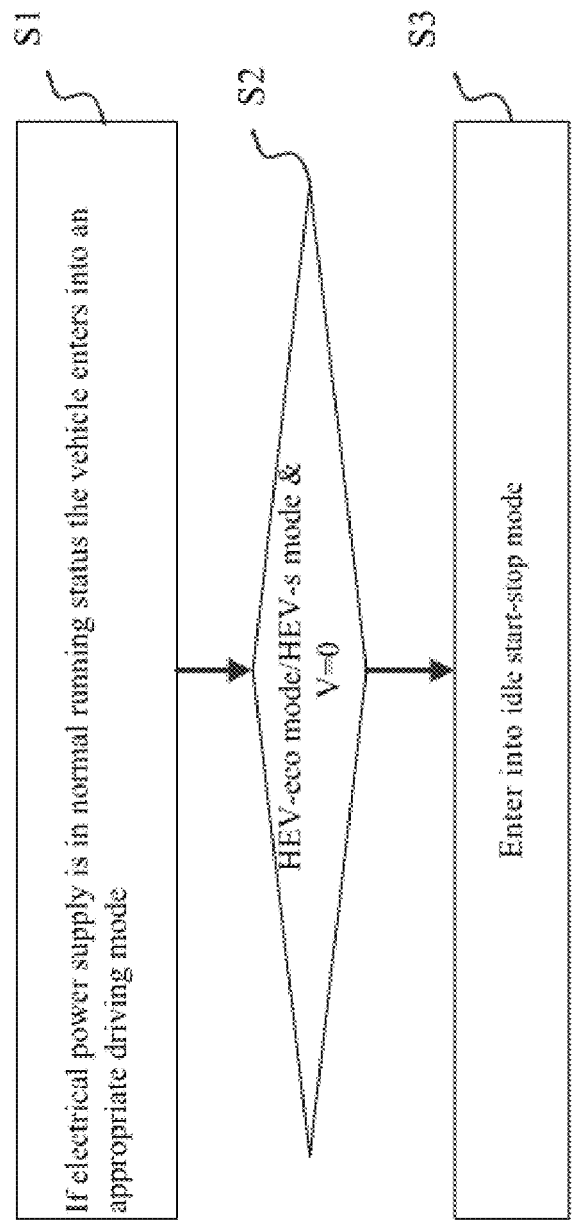
FIG. 11 is a flowchart illustrating a method of controlling a hybrid electric vehicle in accordance with some example embodiments.

FIG. 11 is a flowchart illustrating a method of controlling a hybrid electric vehicle in accordance with some example embodiments. As shown in FIG. 11, the hybrid electric vehicle control method comprises the following steps:

At step S1, when the electric power of the vehicle is on, the engine power subsystem and the motor power subsystem are configured to enable the hybrid electric vehicle to enter into an appropriate operating mode. The driving mode includes HEV-eco mode and HEV-s mode.

The work mode includes EV mode and HEV mode, and the driving mode may include economy mode and sport mode, The EV mode includes two operating modes such as EV-eco mode and EV-s mode, and the HEV mode includes two operating modes such as HEV-eco mode and HEV-s mode.

At step S2, when the hybrid electric vehicle operates in HEV-eco mode and low power mode, or when the hybrid electric vehicle operates in HEV-s mode, the method determines whether the vehicle speed is zero.

At step S3, if it is determined that the vehicle speed is zero at step S2, the hybrid electric vehicle operates by idle start-stop strategy.

In one embodiment of the present invention, shown in FIG. 3, when the hybrid electric vehicle operates in EV-eco mode, the control method further includes the following steps of:

At step S101, a signal indicative of a manual operation of selecting an operating mode is received by the motor control device ("manual selection operating signal"). The manual selection operating signal can be in response to a selection of HEV mode, or sport mode. If no manual operation of selecting operating mode is executed, no such a signal is generated. The control system determines whether a manual operation is executed. If the method determines that a manual operation is executed, the method proceeds to step S102. Otherwise the method proceeds to step S103.

At step S102, the control system is configured to enter into an operating mode in response to the manual selection operation signal and execute a control strategy associated with that manual selection operation. In other words, when the hybrid electric vehicle operates in EV-eco mode, upon receipt of the manual selection operation signal, the control module is configured to enter into a target operating mode in response to the manual selection of the user.

At step S103, no manual operation of selecting operating mode is executed. The vehicle remains in the current operating mode. Then the values of the quantity of electric charge SOC, maximum allowable discharge power of the battery Pb, and the slope i are compared with respective predetermined values. For example, the lower limit of the electric quantity $SOC_{min}$ is 20%. The lower limit of the maximum allowable discharge power of the battery $Pb_{min}$ is 12 KW. The upper limit of the slope $i_{max}$ is 15%.

S104, if any of the above three conditions set at step S103 is met, the operating mode is automatically switched to HEV-eco mode. For example, the SOC is below the lower limit of the electric quantity $SOC_{min}$ 20%, or the maximum allowable discharge power of the battery Pb is below the lower limit of the maximum allowable discharge power of the battery $Pb_{min}$, e.g. 12 KW, or the slope exceeds the upper limit of the slope $i_{max}$ 15%. The operating mode is automatically switched to the HEV-eco mode.

At step S105, if none of the conditions set at step S103 is met, the vehicle remains in EV-eco mode.

In EV-eco mode, when no manual or automatic operation of selecting an operating mode is performed, the motor acts as a single power source to drive the vehicle. This mode prioritizes dynamic performance and electricity savings by avoiding high power consumption resulting from long time use of the battery to improve electricity usage efficiency. The maximum power produced by the motor is limited to $PM_{max}$, e.g., 70 KW. This mode is also designed to meet hill-climbing performance without limiting the maximum torque produced by the motor. In other words, when the hybrid electric vehicle is in EV-eco mode, the hybrid electric vehicle operates with restriction of the power.

When hybrid electric vehicle operates in EV-eco mode, the operating mode may be automatically switched to HEV-eco mode when the SOC, the maximum allowable discharge power, and the slope value are amount to some predetermined values which may enable the vehicle to operate in normal status without having negative impact on dynamic performance. In summary, when the hybrid electric vehicle operates in EV-eco mode, the control method prioritizes dynamic performance and high efficiency thus achieving extended life of the motor, lower operating costs, and less emissions.

In another embodiment of the present invention, as shown in FIG. 4, when the hybrid electric vehicle operates in EV-s mode the control method includes following steps:

At step S201, a manual selection operating signal indicative of a manual operation of selecting operating mode is received by the control system. The manual selection operating signal can be in response to a selection of HEV mode, or sport mode. If no manual operation of selecting operating mode is performed, no such a signal is generated. The control system determines whether a manual operation is performed. If the control system determines that a manual operation is performed, the method proceeds to step S202. Otherwise the method proceeds to step S203.

At step S202, the control system is configured to enter into an operating mode in response to the manual selection operation signal and execute a control strategy associated with the manual selection operation. In other words, when the hybrid electric vehicle in EV-s mode, upon receipt of the manual selection operation signal, the control module is configured to enter into the target operating mode in response to user's manual selection operation.

At step S203, no manual operation of selecting operating mode is performed. The vehicle remains in the current operating mode. Then the SOC values, the maximum allowable discharge power of the battery Pb, and the slope i are compared with respective predetermined values. For example, the lower limit of the electric quantity $SOC_{min}$ is 20%. The lower limit of the maximum allowable discharge power of the battery $Pb_{min}$ is 12 KW. The upper limit of the slope $i_{max}$ is 15%. The control method further determines if $SOC \leq SOC_{min}$, $Pb \leq Pb_{min}$, and $i_{max} \leq i$.

At step S204, if any of the above three conditions set at step S203 is met, the operating mode is automatically switched to the HEV-s mode. For example, the SOC is below the lower limit of the electric quantity $SOC_{min}$, e.g. 20%, or the lower limit of the maximum allowable discharge power of the battery Pb is below the lower limit of the maximum allowable discharge power of the battery $Pb_{min}$ 12 KW, or the slope exceeds the upper limit of the slope $i_{max}$ 15%. The operating mode is automatically switched to the HEV-s mode.

At step S205, if none of the conditions set at step S203 is met, the vehicle remains in EV-s mode.

In EV-s mode, when no manual or automatic operation of selecting mode is performed, the motor acts as a single power source to drive the vehicle. In this mode, no limitation is imposed on the maximum torque and the power that are produced by the engine. Maximum power of the motor is achieved to meet the dynamic demand of the operator, for example, acceleration and hill climbing at high speeds.

When hybrid electric vehicle operates in EV-s mode, the operating mode may be automatically switched to HEV-s mode when the SOC, the maximum allowable discharge power, and the slope value are amount to some predetermined values which may enable the vehicle to operate in normal status without having negative impact on dynamic performance. In summary, when the hybrid electric vehicle is in EV-s mode, the control method is suitable for operating in EV mode without sacrificing dynamic performance. The operating mode is more flexible. The operator can obtain better driving experience.

In another embodiment of the present invention, as shown in FIG. 5, when the hybrid electric vehicle is in HEV-eco the control method comprises following steps:

At step S301, a manual selection operating signal indicative of a manual operation of selecting operating mode is received by the control system. If it determines that a manual operation of selecting EV mode is performed, the method proceeds to step S302. Otherwise, the method proceeds to step S306.

At step S302, the SOC is compared with a predetermined upper limit of the electric quantity $SOC_{max}$ 20%. If it is determined that the SOC exceeds the upper limit of the electric quantity $SOC_{max}$, the method proceeds to step S303. Otherwise, the method proceeds to step S305.

At step S303, the current vehicle speed is compared with the maximum speed $V_{up}$ 150 km/h. In an instance in which the vehicle speed v is below $V_{up}$, the process proceeds to step S304. Otherwise, the process proceeds Step S305.

At step S304, the vehicle enters into EV-eco mode and performs the corresponding control strategy.

When the hybrid electric vehicle operates in HEV-eco mode, upon receipt of a signal indicative of selecting EV-eco mode, if it is determined that the SOC is not less than the upper limit of the electric quantity $SOC_{max}$, e.g., 30%, and the vehicle speed is not greater than the maximum vehicle speed, e.g., 150 km/h, the control module is configured to enable the vehicle to enter into EV-eco mode.

At step S305, the vehicle remains in HEV-eco mode.

When no manual operation of selecting EV mode is performed at step S301, the method proceeds to step S306. At step S306, the method determines that whether manual operation of selecting sport mode has been performed. If a manual operation of selecting sport mode has been performed, the method proceeds to step S307. Otherwise, the process proceeds to step S308.

At step S307, the control system is configured to enable the hybrid electric vehicle to enter HEV-s mode and perform a corresponding control strategy.

At step S308, the operating mode remains in HEV-eco mode. The control system may receive a signal indicative of the gradient of slope. The value of the current slope i is compared with the lower limit of the slope $i_{min}$ (e.g., 5%) and the upper limit of the slope $i_{max}$ (e.g., 15%) at following steps.

At step S309, the slope of the road is compared with lower limit of the slope $i_{min}$. If it is determined that the slope is $\leq i_{min}$, the method proceeds to the next step S310.

At step S310, the SOC is compared with upper limit of the electric quantity $SOC_{max}$ (e.g., 30%) and lower limit of the electric quantity $SOC_{min}$ (e.g., 20%). The maximum allowable discharge power of the battery Pb is compared with the upper limit of the power of the battery $Pb_{max}$ (e.g., 30 KW) and lower limit of the power of the battery $Pb_{min}$ (e.g., 12 KW).

At step S311, the SOC is compared with the upper limit of the quantity of electric charge $SOC_{max}$. Pb is compared with upper limit of the maximum allowable discharge power of the battery $Pb_{max}$. If the method determines $SOC_{max} \leq$ SOC and $Pb_{max} \leq Pb$, the method proceeds to step S312. Otherwise, the method proceeds to step S313.

At step S312, the hybrid electric vehicle employs economy strategy in operation.

In other words, when the hybrid electric vehicle is in HEV-eco mode, under the conditions that the slope is less than lower limit of the slope value $i_{min}$, e.g., 5%, the SOC is not less than the upper limit of the electric quantity $SOC_{max}$, e.g., 30%, and the maximum allowable discharge power of the battery is not greater than the upper limit of the power of the battery $Pb_{max}$, e.g., 30 KW, the control module is configured to enable the hybrid electric vehicle to operate in economy manner.

At step S313, if the method determines that $SOC_{max} > SOC > SOC_{min}$ and $Pb_{max} \leq Pb$, or $SOC_{max} \leq SOC$ and $Pb_{max} > Pb > Pb_{min}$, the method proceeds to step S314. Otherwise, the method proceeds to step S315 to further compare the SOC with lower limit of the electric quantity $SOC_{min}$ and maximum allowable discharge power Pb with lower limit of the maximum allowable discharge power $Pb_{min}$. In other words, when the SOC and the maximum allowable discharge power Pb do not meet the conditions set at step S311 and S313, i.e., $SOC \leq SOC_{min}$, $Pb \leq Pb_{min}$, the method proceeds to step S315.

At step S314, the control strategy that is employed in previous operation is remained to be used in current operation. In other words, if the hybrid electric vehicle employed economy manner in previous operation the hybrid electric vehicle may continue to employ economy manner in current operation. Likewise, if the hybrid electric vehicle employed low power manner in previous operation the hybrid electric vehicle may continue to employ low power manner in current operation.

At step S315, if the method determined that $SOC \leq SOC_{min}$, $Pb \leq Pb_{min}$, the method proceeds to step S316.

At step S316, the hybrid electric vehicles employs low power manner in operation.

In other words, when the hybrid electric vehicle is in HEV-eco, under the conditions that the slope is not greater than lower limit of the slope, e.g., 5% and the SOC is not greater than the lower limit of the electric quantity $SOC_{min}$, e.g., 20%, or under the conditions that the slope is not greater than lower limit of the slope, e.g., 5%, and the maximum allowable discharge power of the battery is not greater than the lower limit of the power of the battery, e.g., 12 KW, the control module is configured to enable the hybrid electric vehicle to operate in low power manner. The upper limit of the electric quantity is greater than the lower limit of the electric quantity. The upper limit of the power is greater than the lower limit of the power.

At step S317, it further compares the slope i with the lower limit of the slope $i_{min}$ and the upper limit of the slope $i_{max}$. If it is determined that $i_{max} > i > i_{min}$, the method proceeds to step S318. Otherwise, the method proceeds to step S319.

At step S318, the control strategy that is employed in previous operation remains to be used in current operation. In other words, despite $i_{max} > i > i_{min}$, the control strategy is the same as $i \leq i_{min}$ or $i_{max} \leq i$, which has been employed in previous operation.

At step S319, the slope i is further compared with $i_{max}$. If it is determined that $i_{max} \leq i$ the method proceeds to step S320.

At step S320, the vehicle is disabled to work in EV mode at low speeds. Engine alone is used to drive the vehicle. No limitation is imposed on maximum output of the engine and the motor.

It should be noted that, in the embodiments of the present invention, low power manner means that the engine enables the motor to generate power quickly, thereby making the motor out of low-power state. In this manner, the motor is enabled to keep the engine work in fuel economic area.

FIG. 6 is a flow chart illustrating when the hybrid electric vehicle operates in economy mode, the control method comprises following steps:

At step S401, signal indicative of the vehicle speed is received. The vehicle speed is compared with upper limit of vehicle speed $V_{max}$ (e.g., 30 km/h) and lower limit of vehicle speed $V_{min}$ (e.g., 15 km/h).

At step S402, vehicle speed is compared with upper limit of vehicle speed $V_{max}$. If it is determined that $V_{max} \leq V$, the method proceeds to step S403. Otherwise, the method proceeds to step S415.

Then the torque requisition $T_R$ is compared with upper limit and lower limit of the preset torque. At step S403, if the method determines that the vehicle torque requisition $T_R$ exceeds the maximum torque curve, as shown in FIG. 7, the method proceeds to step S404. Otherwise, the method proceeds to step S407.

At step S404, it is determined that whether fault has been detected in the power system. If fault has been detected in the power system, the method proceeds to step S406. Otherwise, the method proceeds to step S405.

At step S405, the engine may produce torque according to the maximum torque curve. The electric motor may compensate the torque. In other words, when the hybrid electric vehicle operates in economy mode, under the conditions that the vehicle speed is not less than the upper limit of vehicle speed, e.g., 30 km/h, and the vehicle torque requisition $T_R$ exceeds the maximum torque $T_{max}$ permitted from the engine, such as beyond the vehicle maximum engine torque curve, the control module enables the engine to produce torque in accordance with the maximum torque curve and enables the motor to supplement the torque.

At step S406, the fault has been detected in power system. Troubleshooting is performed to identify the fault.

At step S407, if the method determines that the torque requisition $T_R$ is less than the minimum torque $T_{min}$ permitted from the engine, such as under the minimum torque curve as shown in FIG. 7, the method proceeds to step S408. Otherwise, the method proceeds to step S411.

At step S408, the method determines whether fault has been detected in the power system, the method proceeds to step S410. Otherwise, the method proceeds to step S409.

At step S409, no fault has been detected in the power system which is determined at step S408. The engine may produce torque according to the minimum torque curve. Extra torque produced by the engine may be used to supply power to the electric motor. Electric motor generates power. In other words, when the hybrid electric vehicle operates in economy manner, under the conditions that the hybrid electric vehicle speed is not less than the upper limit of vehicle speed, e.g., 30 km/h, and the requisite torque is less than the lower limit curve of torque, the control module enables the engine to produce the torque in accordance with the minimum torque curve and supply power to the electric motor.

At step S410, when fault has been detected in the power system, troubleshooting procedure is performed to identify fault of the power system.

At step S411, when the torque requisition $T_R$ does not exceed the maximum torque $T_{max}$ permitted from the engine and exceeds the minimum torque $T_{min}$ produced by the engine, namely, under the preset maximum engine torque curve and beyond the preset minimum engine torque curve, as shown in FIG. 7, the method proceeds to step S412.

At step S412, is the method determines that if fault has been detected in the power system. If yes, the method proceeds to step S414. If no fault has been detected in the power system, the method proceeds to step S413.

At step S413, when the engine meets the torque requisition $T_R$ of the vehicle, extra torque generates power. In other words, when the hybrid electric vehicle operates in economy mode, under the conditions that the vehicle speed exceeds the upper limit of vehicle speed, e.g., 30 km/h, and the torque requisition $T_R$ does not exceed the maximum torque $T_{max}$ permitted from the engine and exceeds the minimum torque $T_{min}$ produced by the engine, namely, under the preset maximum engine torque curve and beyond the preset minimum engine torque curve, the control module enables the engine to produce torque in accordance with minimum torque curve and supply power to the electric motor. The power generation strategy of the engine is in compliance with the relationship between the SOC as shown in FIG. 8. The power generation strategy also meets two conditions: the power supplied to the electric motor is not greater than $T_{max}$ and the torque produced by the engine does not exceed maximum torque $T_{max}$ permitted from the engine, such as beyond the vehicle maximum engine torque curve. If any of the above two conditions is not met, limitation is imposed on the torque supplied to the electric motor.

At step S414, if fault has been detected in power system, troubleshooting is performed.

At step S415, the method further compares the vehicle speed with the upper limit of vehicle speed $V_{max}$ and the lower limit of vehicle speed $V_{min}$. If the method determines that $V_{max} > V > V_{min}$, the method proceeds to step S416. Otherwise, the method proceeds to step S419.

At step S416, the method determines if fault has occurred in the power system. If fault has been detected, the method proceeds to step S418. If no fault has been detected, the method proceeds to step S417.

If no fault has been detected at step S416, the control strategy that is employed in previous operation remains to be used in current operation at step S417. In other words, if motor is the single source to drive the vehicle in previous operation, i.e., EV mode, the drive mode remains in EV mode in the current operation. If the motor supplements the engine to drive or generate power, the motor works in the same manner in current operation.

At step S418, if fault has been detected in power system, troubleshooting procedure is performed to identify fault.

At step S419, the vehicle speed is compared with predetermined lower limit of vehicle speed $V_{min}$. If the method determines that $V \leq V_{min}$, the method proceeds to step S420.

At step S420, if fault has been detected in the power system, the method proceeds to step S422. Otherwise, the method proceeds to step S421.

At step S421, if no fault has been detected in the power system, the vehicle operates in EV mode. The engine turns off. In other words, when the hybrid electric vehicle operates in economy mode. If the vehicle speed is below the lower limit of the vehicle speed, e.g., 15 km/h, the vehicle operates in EV mode.

In this embodiment, as shown in FIG. 9, when the hybrid electric vehicle operates in low power manner, the method includes following steps:

At step S501, a signal indicative of the current transmission shift lever position is received.

At step S502, if the method determines that the transmission shift lever is not in park P, the method proceeds to step S503.

At step S503, the torque requisition $T_R$ of the vehicle is compared with upper limit of the torque and lower limit of the torque. If the method determines that the torque requisition $T_R$ exceeds the maximum torque $T_{max}$ permitted from the engine, such as beyond the vehicle maximum engine torque curve as shown in FIG. 7, the method proceeds to step S504. Otherwise, the method proceeds to step S507.

At step S504, if fault has been detected in the power system, the method proceeds to step S506. If no fault has been detected in the power system, the method proceeds to step S505.

At step S505, if no fault has been detected in the power system at step S504, the engine may produce torque in accordance with maximum torque curve. The electric motor may supplement the torque. In other words, when the transmission shift lever is not in park P, under the condition that the torque requisition $T_R$ is exceeds the maximum torque $T_{max}$ permitted from the engine, such as beyond the vehicle maximum engine torque curve, the control module enables the engine to produce torque in accordance with maximum torque curve and enables the motor to supplement the torque.

At step S506, if fault has been detected in the power system, troubleshooting procedure is performed to identify the fault.

At step S507, the torque requisition $T_R$ of the vehicle is compared with upper limit of the torque and lower limit of the torque. If the method determines that the torque requisition $T_R$ is less than the minimum torque $T_{min}$ permitted from the engine, such as under the minimum torque curve, as shown in FIG. 7, the method proceeds to step S508. Otherwise, the method proceeds to step S511.

At step S508, if fault has been detected in the power system, the method proceeds to step S510. Otherwise, the method proceeds to step S509.

At step S509, if no fault has been detected in the power system, the engine may produce torque in accordance with minimum torque curve. Extra torque produced by the engine may be used to supply power to the electric motor. In other words, when the transmission shift lever is not in park P and the torque requisition $T_R$ is less than the minimum torque $T_{min}$ permitted by the engine, the control module enables the engine to produce torque in accordance with minimum torque curve and supply power to the electric motor.

At step S510, if fault has been detected in the power system, troubleshooting procedure is performed to identify the fault.

At step S511, when the torque requisition $T_R$ does not exceed the maximum torque $T_{max}$ permitted from the engine and exceeds the minimum torque $T_{min}$ produced by the engine, namely, under the preset maximum engine torque curve and beyond the preset minimum engine torque curve, as shown in FIG. 7, the process proceeds to step S512.

At step S512, if fault has been detected in the power system, the method proceeds to step S514. Otherwise, the method proceeds to step S513.

At step S513, when the engine meets the torque requisition $T_R$ of the vehicle, extra torque may be supplied to the electric motor. In other words, when the hybrid electric vehicle operates in low power mode, under the conditions that the transmission shift lever is not in park P, and the torque requisition $T_R$ does not exceed the maximum torque $T_{max}$ permitted from the engine and exceeds the minimum torque $T_{min}$ produced by the engine, namely, under the preset maximum engine torque curve and beyond the preset minimum engine torque curve, the control module enables the engine to produce torque in accordance with torque requisition $T_R$ and supply power to the electric motor. The power generation strategy of the engine is in compliance with the relationship between the power and the SOC as shown in FIG. 8. The power generation strategy also meets two conditions: the power supplied to the electric motor is not greater than $T_{max}$ and the torque produced by the engine does not exceed maximum torque $T_{max}$ permitted by the engine, such as beyond the vehicle maximum engine torque curve. If any of the above two conditions is not met, limitation is imposed on the torque supplied to the electric motor.

At step S514, if fault has been detected in the power system, troubleshooting procedure is performed to identify the fault.

At step S515, if the method determines that the transmission shift lever is park P, the method proceeds to step S516.

At step S516, idle start-stop strategy is executed. In other words, when hybrid electric vehicle operates in low power mode and transmission is in park P, the control module is configured to enable the hybrid electric vehicle to operate by idle start-stop strategy. When the hybrid electric vehicle operates by idle start-stop strategy, the control module also determines whether the hybrid electric vehicle idle start-stop conditions are satisfied. When the control module determines that the hybrid electric vehicle satisfies the idle start-stop conditions, such as vehicle speed is zero, transmission is in park P, and the SOC is not less than 20%, the control module is configured to shut down the engine power subsystem.

When the hybrid electric vehicle operates in HEV-eco mode, in the area that is outside the fuel economic area, the electric motor supplements the power of the engine to drive the load and improve fuel efficiency. When vehicle operates in economy mode, the engine operates in the fuel economic area, the engine charges battery. The lower the electric charge, the higher the charge efficiency. The maximum power produced by the electric motor is set to be less than $PM_{max}$ to avoid high power consumption resulting from long time use of the battery, thereby keep the electric charge at a relatively high level. In this manner, the motor is enabled to keep the engine work in fuel economic area, thereby reducing fuel consumption and improving economy and emission. When the load is large, the engine may produce the torque in accordance with maximum engine torque curve. The electric motor may supplement the torque. Dynamic performance is enhanced in comparison with the EV mode. When user desires to drive long distance with minimum fuel consumption, user can select the HEV-eco mode.

In another embodiment of the present invention an embodiment, as shown in FIG. 10, when the hybrid electric vehicle operates in HEV-s mode, the control method comprises following steps:

At step S601, a signal indicative of a manual operation of selecting an operating mode is received by the control system to determine if EV mode is manually selected by operator. If yes, the method proceeds to step S602. Otherwise, the method proceeds to step S606.

At step S602, the SOC is compared with a predetermined upper limit of electric quantity $SOC_{max}$, e.g., 30%. If the method determines that the SOC exceeds upper limit of electric quantity $SOC_{max}$, the method proceeds to step S603. Otherwise, the method proceeds to step S605.

At step S603, the vehicle speed is compared with the maximum vehicle speed $V_{up}$, e.g., 150 km/h. If the current vehicle speed V below the maximum vehicle speed $V_{up}$, the vehicle is allowed to switch the operating mode from the HEV mode to the EV mode. In an instance in which the current vehicle speed V is below the predetermined upper limit of speed $V_{up}$, the process proceeds to step S604. Otherwise, the process proceeds step S605.

At step S604, the vehicle enters into EV-eco mode and executes corresponding control strategy.

When the hybrid electric vehicle operates in HEV-s mode, upon receipt of signal indicative of selecting EV-s mode, if the method determines that the SOC exceeds the upper limit of the electric quantity $SOC_{max}$, e.g., 30%, and the current vehicle speed is below the maximum vehicle speed, e.g., 150 km/h, the control module is configured to enable the vehicle to enter into EV-s mode.

At step S605, the vehicle remains in HEV-s mode.

When no manual operation of selecting EV mode is performed which is determined at step S601, the method proceeds to step S606. At step S606, the method further determines that whether manual operation of selecting the economy mode is performed. If a manual operation of selecting the economy mode is performed, the method proceeds to step S607. Otherwise, the process proceeds to step S608.

At step S607, if the method determines that a manual operation of selecting the economy mode is performed at step S606, the control system is configured to enable the hybrid electric vehicle to enter into HEV-eco mode and execute a corresponding control strategy.

At step S608, if the method determines that no manual operation of selecting the economy mode is performed at step S606, the vehicle remains the previous operating mode. The control system may receive a signal indicative of transmission shift lever position.

At step S609, upon receipt of the signal indicative of transmission shift lever position, the method further determines if the transmission shift lever is in park P. If the method determines that the transmission shift lever is in park P, the method proceeds to step S610.

At step S610, if the method determines that the transmission shift lever is in park P at step S609, idle start-stop strategy is executed. In other words, when the hybrid electric vehicle operates in HEV-s mode, and the transmission shift lever is in park P, the control module is configured to enable the vehicle to operate by idle start-stop strategy.

At step S611, if the method determines that the transmission shift lever is not in park P, the method proceeds to step S612.

At step S612, the vehicle torque requisition $T_R$ is compared with peak torque, i.e., maximum torque $T_{max}$. If the torque requisition $T_R$ exceeds the preset peak torque $T_{max}$, the method proceeds to step S613. Otherwise, the method proceeds to step S614.

At step S613, the engine may produce maximum torque. The electric motor may supplement the torque. If charge or discharge capacity of the battery is restricted by characteristics of the electric motor or the battery, the electric motor and battery may drive the vehicle using maximum capabilities. In other words, when the hybrid electric vehicle operates in HEV-s mode, if the transmission shift lever is not in park P and the vehicle torque requisition $T_R$ exceeds the maximum torque $T_{max}$, the control system is configured to enable the engine to produce its maximum torque $T_{max}$ and the motor to supplement the torque.

At step S614, when the engine meets the torque requisition of the vehicle, extra torque may be supplied to the electric motor. In other words, when the hybrid electric vehicle operates in HEV-s mode, under the conditions that the transmission shift lever is not in park, when the torque requisition $T_R$ does not exceed the maximum torque $T_{max}$ permitted from the engine, the control module enables the engine to produce torque in accordance with torque requisition and supply power to the electric motor. The power generation strategy of the engine is in compliance with the relationship between the power and the SOC as shown in FIG. 8. The power generation strategy also meets two conditions: the power supplied to the electric motor is below maximum torque $T_{max}$ and the torque produced by the engine does not exceed the maximum torque $T_{max}$ permitted from the engine, such as beyond the vehicle maximum engine torque curve. If any of the above two conditions is not met, limitation is imposed on the torque supplied to the electric motor.

In HEV-s mode, when the transmission shift lever is not in park P and the engine is on. When the transmission shift lever is in park P and conditions of idle start-stop strategy are met, the engine turns off. In HEV-s mode, no limitation is imposed on the maximum torque and maximum power that are produced by the motor and the engine respectively, thereby achieving maximum drive capability and the best dynamic performance among four modes. In this mode, engine keeps running. Accordingly, either engine and motor drive the vehicle together or engine acts as a single source to drive the vehicle and supplies power to motor (when quantity of electric charge SOC value is below a certain level). Fuel consumption is increased with sacrificing economy performance. The HEV-s mode is suitable for user who desires dynamic performance and acceleration performance.

In an embodiment of the present invention, by manually selecting EV, HEV, eco, sport buttons, four different operating modes, i.e., EV-eco, EV-s, HEV-eco, HEV-s, can be selected. User may select an appropriate operating mode to achieve different drive strategy according to dynamic performance and economy performance of the four operating modes. The power system employees parallel configuration, rather than series or series-parallel configurations. In addition, the engine starting point is optimized to increase vehicle speed value that determines transition between different operating modes. Slope is added to the conditions to determine transition between different operating modes. Power requisition is not a condition to determine transition between different operating modes. In HEV-eco mode where economy strategy is employed, engine operating area is restricted between the maximum torque curve and minimum torque curve. Power varies with the quantity of electric charge SOC.

In the control system in accordance with embodiments of the present invention, multiple operating modes available for user's selection can meet drive demand under different road conditions, such as electric-only in city and dynamic performance in country. Compared to the series configuration employed by the power system on existing hybrid electric vehicle, the parallel configuration employed by the engine power subsystem and the motor power subsystem improves the energy efficiency. Since the parallel configuration is simpler than series-parallel configuration, complex operation employed in series-parallel configuration to switch between modes is avoided. Smooth operation between different operating modes and economy performance are improved without sacrificing dynamic performance. The operating area of engine is optimized to make the engine operate in high efficiency area. The power generation is optimized to keep quantity of electric charge SOC at high level, thereby reducing fuel consumption and omission. In addition, this mode prioritizes dynamic performance and allows the vehicle to drive extended distances. High power consumption resulting from long time use of the battery is avoided to improve electricity usage efficiency. Frequent starts and stops is avoided which may help to extend the life of the motor, reduce noise, and improve driving comfort.

Figure 12:
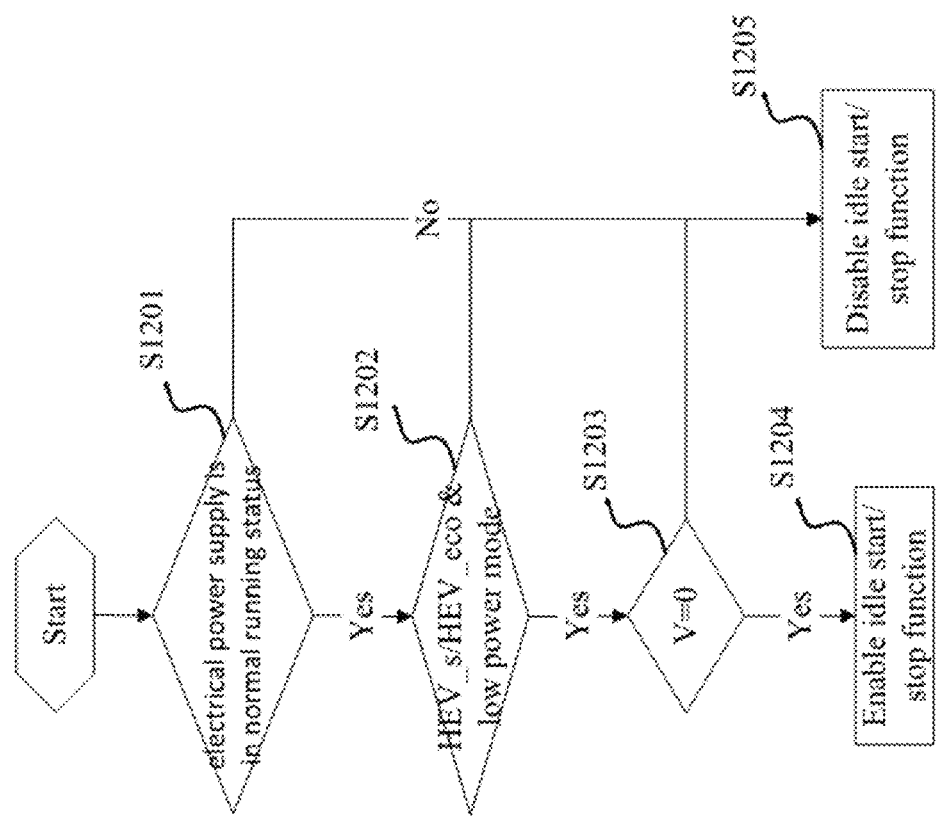
FIG. 12 is a flowchart illustrating a method of determining enablement of idle start-stop function in accordance with some example embodiments.

With references to FIGS. 12-14, a control method of controlling executing idle start-stop strategy is described in accordance with some example embodiments.

FIG. 12 is a flowchart illustrating a method of determining how to control execution of idle start-stop strategy in accordance with some example embodiments. The method comprises following steps:

At step S1201, the method determines whether vehicle's electric power is on. If yes, the method proceeds to step S1202. If no, the method proceeds to step S1205.

Determining whether vehicle's electric power is on may ensure no fault has occurred in the high pressure system. The engine can be enabled to start and stop if no fault has been detected.

At step S1202, the method determines that if the operating mode is HEV-s mode or HEV-eco mode by low-power strategy. If yes, the method proceeds to step S1203. If no, the method proceeds to step S1205.

When hybrid electric vehicle operates in HEV-s mode or HEV-eco mode with employment of low power strategy, the engine is running. The method may enable the engine to start, stop or idle. Specifically, in HEV-eco mode, the engine and the motor's operating manner may be determined by economy strategy or low power strategy according to the quantity of electric charge of the quantity of electric charge SOC and the maximum allowable discharge power Pb. In HEV-eco mode, by employing economy strategy, the vehicle is driven in EV mode at low speeds. When the vehicle speed is exceeds the upper limit of the vehicle speed, the motor supplements the engine's power until the vehicle speed drops below the lower limit of the vehicle speed with the motor acting as the single source. In HEV-eco mode, the vehicle is disabled to work in EV mode at low speeds. Both engine and motor drive the vehicle at low speeds. Idle start-stop function is enabled in this mode. In HEV-s mode, engine keeps running. Even the vehicle speed below a certain value, the operating mode may not be switched to EV mode. In HEV-eco mode with economy strategy, when vehicle stops, engine is shut off. The idle start-stop function is disabled. In HEV-eco mode with low power strategy, when vehicle stops, the engine keeps running. The idle start-stop function is enabled. In HEV-s mode, the engine keeps running regardless. The idle start-stop function is enabled. In other operating modes, when vehicle stops, engine is shut off. The idle start-stop function is disabled.

At step S1203, the method determines if the vehicle speed is zero. If yes, the method proceeds to step S1204. If no, the method proceeds to step S1205.

At step S1204, when ECN determines that all of conditions at steps S1201~S1203 are met, the idle start-stop function is enabled. The control system enables the hybrid electric vehicle to operate by idle start-stop strategy.

At step S1205, when ECN determines that any of the condition at steps S1201~1203 is not satisfied, the idle start-stop function is disabled.

FIG. 13 is a flowchart illustrating a method of determining when to shut down engine when hybrid electric vehicle operate by idle start-stop strategy and engine is running in accordance with some example embodiments. The control method comprises the following steps:

At step S1301, the method determines that if the idle start-stop function is enabled. If the idle start-stop function is enabled, the method proceeds to step S1302. If the idle start-stop function is disabled, the method proceeds to step S1308.

At step S1302, the method determines that if no fault has been detected in the high pressure system. If no fault has been detected in the high pressure system, the method proceeds to step S1303. If fault has been detected in the high pressure system, the method proceeds to step S1308.

Occurrence of the fault in high pressure system may cause the motor to stop to produce torque or cause the battery stop to supply power. The vehicle operates on engine only to ensure power supply to the vehicle. So it desires to determine if fault has occurred in the high-pressure system. When fault has been detected in the high pressure system, the engine is not allowed to operate by idle start-stop strategy.

At step S1303, the method determines whether the motor control device communicates well with other modules when idle start-stop function is enabled. If the communication between modules works well, the method proceeds to step S1304. If the communication between modules does not work well, the method proceeds to step S1308.

At step S1304, the method determines whether the transmission shift lever is in park P. If the transmission shift lever is in park P, the method proceeds to step S1305. If the transmission shift lever is not in park P, the method proceeds to step S1308.

At step S1305, the method determine if the maximum allowable discharge power of the battery Pb exceeds upper limit of the allowable discharge power of the battery $Pb_{max}$. If the maximum allowable discharge power of the battery Pb exceeds upper limit of the maximum allowable discharge power of the battery $Pb_{max}$, the method proceeds to step S1306. If the maximum allowable discharge power of the battery Pb below the upper limit of the maximum allowable discharge power of the battery $Pb_{max}$, the method proceeds to step S1308.

When hybrid electric vehicle exits the idle start-stop mode, from the time that engine is turned on to the time that engine produces torque, time spent by engine's start and clutch's engagement may cause delay of the torque output. The battery can meet motor's minimum torque requisition by determining the maximum allowable discharge power.

At step S1306, the method determines that if water temperature at engine thermostat Temp exceeds upper limit of temperature $Temp_{max}$. If water temperature at engine thermostat Temp exceeds the upper limit of preset temperature $Temp_{max}$, the method proceeds to step S1307. Otherwise, the method proceeds to step S1308.

At step S1307, if all the conditions set at steps S1301~S1306 are met, the ECN sends an engine stop command to request the engine to turn off. The ECM is configured to execute the engine stop command upon receipt of the engine stop command.

At step S1308, if any of conditions set at steps S1301~S1306 is not met, the ECN does not send the request command. The engine remains on.

In other words, when the hybrid electric vehicle operates by idle start-stop strategy and the engine is on, when all of the following conditions are satisfied, the engine stops running by the control module:

(1) no fault has been detected in the high-pressure system;

(2) communication system is in normal state. For instance, the ECN is capable of communicating with other modules when idle start-stop function is enabled;

(3) transmission shift lever is in park P;

(4) maximum allowable discharge power by the battery exceeds the upper limit of the power; and (5) water temperature at engine thermostat Temp exceeds the upper limit of the preset temperature $Temp_{max}$.

In other words, whether to operate by idle start-stop strategy is determined by transmission shift lever position. When all conditions of idle start-stop function are met and the transmission shift lever is in park P, the vehicle enters into the idle start-stop mode. Engine turns off. By contrast, when the transmission shift lever is not in park P, the engine may operate by idle start-stop strategy. The engine is running.

FIG. 14 a flowchart illustrating a method of determining when to start engine when hybrid electric vehicle operates by idle start-stop strategy and engine is shut down in accordance with some example embodiments. The method comprises following steps:

At step S1401, the method determines if the idle start-stop function is enabled. If the idle start-stop function is enabled, the method proceeds to step S1402. If the idle start-stop function is disabled, the method proceeds to step S1407.

At step S1402, the method determines if fault has been detected in the high-pressure system. If fault has been detected in the high-pressure system, the method proceeds to step S1408. Otherwise, the method proceeds to step S1403.

Occurrence of the fault in high pressure system may cause the motor to stop to produce torque or cause the battery stop to supply power. The vehicle operates on engine only to ensure power supply to the vehicle. So it desires to determine if fault has occurred in the high-pressure system. When fault has been detected in the high pressure system, the engine is not allowed to operate by idle start-stop strategy.

At step S1403, the method determines whether the ECN can communicate with other modules when idle start-stop is enabled. In other words, the method determines whether communication fault has been detected in the communication between the ECN and other modules in the idle start-stop unit. If fault has been detected in the communication between the ECN and other modules in the idle start-stop unit, the method proceeds to step S1408. Otherwise, the method proceeds to step S1404.

At step S1404, the method determines whether the transmission shift lever is in park P. If the transmission shift lever is not in park P, the method proceeds to step S1408. Otherwise, the method proceeds to step S1405.

At step S1405, the method determines that whether the maximum allowable battery discharge power is below the lower limit of the maximum allowable discharge power $Pb_{min}$. If the maximum allowable battery discharge power is below the lower limit of the maximum allowable discharge power $Pb_{min}$, the method proceeds to step S1408. Otherwise, the method proceeds to step S1406.

When hybrid electric vehicle exits the idle start-stop mode, from the time that engine is turned on to the time that engine produces torque, time spent by starting the engine and the engagement of the clutch may cause delay of the torque output. The battery can meet the minimum torque requisition of the motor by determining the maximum allowable discharge power.

At step S1406, the method determines that if water temperature at engine thermostat Temp is less than lower limit of temperature $Temp_{min}$. If water temperature at engine thermostat Temp is less than lower limit of temperature $Temp_{min}$, the method proceeds to step S1408. Otherwise, the method proceeds to step S1407.

At step S1407, if condition set at S1401 is not met or all of the conditions at steps S1402~S1406 are not met, the ECN does not send engine start command, the engine remains off.

At step S1408, if condition set at step S1401 is met or any condition of the conditions set at steps S1402~S1406 is met, the ECN sends engine start command, the ECM executes the engine start command by starting the engine.

Whether to operate by idle start-stop strategy can be determined by transmission shift lever position. When conditions of idle start-stop function are not met and the transmission shift lever is not in park P, the vehicle exits the execution of idle start-stop strategy. Engine turns on. By contrast, when the transmission shift lever is in park P, the engine may operate by idle start-stop strategy. The engine is turned off.

In summary, the control method of embodiments of the present invention can be applied to transitions strategy between different operating modes. The control method includes determination of work mode, operating mode, the maximum allowable battery discharge power, electricity supply of the entire vehicle, and fault detection in high pressure system and communication system. In addition, the method optimizes the water temperature at engine thermostat and the maximum allowable battery discharge power. By determining the work mode, operating mode, the control method can be applied to transition strategy between different operating modes to avoid affecting mode transitions, thereby keeping the vehicle to operate in normal status, avoiding frequently start and stop. Determination of the maximum allowable battery discharge power can enable the battery to meet motor's minimum torque requisition, thereby compensating the engine's delayed start when vehicle moves. Detection of fault in the high pressure system can wake up engine and enable engine to work when electricity supply works abnormally or fault has been detected in the high pressure system. Sudden drop in quantity of electric charge or battery failure may negatively affect the electrical equipment or cause the failure of the electrical equipment. By optimizing the water temperature at engine thermostat and the maximum allowable battery discharge power and controlling upper limit of the water temperature at engine thermostat $Temp_{max}$ and lower limit of the water temperature at engine thermostat $Temp_{min}$ and the maximum allowable battery discharge power, engine's frequent starts and stops is avoided when variables' value vary around the threshold value, thereby reducing fuel consumption and omission, extending the life of the motor.

In the control system in accordance with embodiments of the present invention, multiple operating modes available for user's selection can meet drive demand under different road conditions, such as electric-only in city and dynamic performance in country. The idle start-stop strategy may reduce the fuel emissions and frequent starts and stops which may help to extend the life of the motor. The engine idle start-stop function is disabled when power is not on which may guarantee the power supply to the electrical equipment.

It should be understood that the computer readable storage device herein can be a volatile memory or a non-volatile memory, or may comprise both a volatile memory and a non-volatile memory. As an example rather than limitation, the non-volatile memory may comprise ROM, Programmable ROM (PROM), Electrically Programmable ROM (EPROM), Electrically Erasable Programmable ROM (EEPROM), or a flash memory. The volatile memory may comprise RAM, and said RAM may be used as an external cache memory. As an example rather than limitation, RAM may be obtained in a variety of ways, for example, Synchronous RAM (DRAM), Dynamic RAM (DRAM, Synchronous DRAM (SDRAM), Double Data Rate SDRAM (DDR SDRAM), Enhanced SDRAM (ESDRAM), Synchronous Link DRAM (SLDRAM), and Direct Rambus RAM (DRRAM). The disclosed storage devices intend to include, but not be limited by, these and other proper types of memories.

Those skilled in the art should also understand that various exemplary logic blocks, units, circuits and algorithm steps described by combining the disclosure herein may be realized as electronic hardware, computer software or combinations of the two. To clearly describe such an interchangeability of hardware and software, a general description has been provided in terms of functions of various exemplary assemblies, blocks, units, circuits and steps. Whether such functions are realized as software or hardware is dependent on specific applications and design restrictions applied on the entire system. Those skilled in the art may achieve the functions in a variety of ways according to each specific application, but such a decision of implementation may not be construed as leading to departure from the scope of the present invention.

Various exemplary logic blocks, units, and circuits described by combining the disclosure herein may be realized or executed by using the following components designed to execute the functions herein: general processor, DSP, ASIC, FPGA or other programmable logic devices, discrete gates or transistor logics, discrete hardware parts or any combination of these components. The general processor may be a microprocessor, but alternatively, the processor may be any conventional processor, controller, microcontroller or state machine. The processor may also be realized as a combination of computing devices, such as a combination of DSP and microprocessors, multiple microprocessors, one or more microprocessors combined with DSP core, or any other configurations like this.

Algorithm steps described by combining the disclosure herein may be directly contained in hardware, a software unit executed by a processor or a combination of the two. The software unit may reside in a RAM, flash memory, ROM, EPROM, EEPROM, register, hard drive, portable drive, CD-ROM, or any other form of storage media known in the art. An exemplary storage medium is coupled to a processor such that the processor can read information from or write information into said storage medium. In an alternative solution, the storage medium may be integrated with a processor. The processor and storage medium can reside in ASIC. ASIC can reside in a user terminal. In an alternative solution, the processor and storage medium may reside in a user terminal as discrete components.

In one or more exemplary designs, the functions may be realized in hardware, software, firmware or any combinations thereof. If realized in software, the functions may be stored in a computer readable medium or transmitted via a computer readable medium as one or more commands or codes. The computer readable medium comprises computer storage medium and communication medium, said communication medium comprises any medium that facilitates the transmission of a computer program from one position to another position. The storage medium may be any usable medium that can be accessed by a general or dedicated computer. As an example rather than limitation, the computer readable medium may comprise RAM, ROM, EEPROM, CD-ROM or other laser disc storage devices, magnetic disc storage devices or other magnetic storage devices, or may be any other medium that can be used to carry or store desired programs codes in the form of commands or data structures and can be accessed by a general or dedicated computer or a general or dedicated processor. In addition, any connection may be appropriately referred to as a computer readable medium. For example, if a co-axial cable, optical fiber cable, twisted-pair cable, Digital Subscriber Line (DSL) or a wireless technology, such as IR, radio and microwave, is used to transmit software from a website, server or other remote sources, then the above co-axial cable, optical fiber cable, twisted-pair cable, DSL or the wireless technology, such as IR, radio and microwave, are all included in the definition of medium. As used herein, magnetic disc and laser disc comprise compressed disc (CD), laser disc, CD, DVD, floppy disk, blu-ray CD, wherein the magnetic disc typically reproduces data magnetically, while CD uses laser to optically reproduce data. Combinations of the above content should also be included in the scope of computer readable medium.

Although the above disclosure shows the exemplary embodiments of the present invention, it should be noted that, without departing from the scope of the present invention defined by the claims, a variety of changes and modifications may be made. Functions, steps and/or actions of the method claims according to the embodiments of the present invention described herein do not need to be executed in any specific sequence. Moreover, although elements of the present invention may be described or requested in an individual form, they can be assumed to be multiple as well, unless they are specifically limited to be a single one.

The embodiments are all described in a progressive manner, identical or similar parts among the embodiments can see each other, and each embodiment is focused on places that are different from other embodiments. For the system embodiments, in particular, the description is relatively simple since they are substantially similar to the method embodiments. See the description of the method embodiments for related parts thereof.

Many modifications and other example embodiments set forth herein will come to mind to one skilled in the art to which these example embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A control system for a hybrid electric vehicle, comprising:
    a transmission system configured to drive wheels of the hybrid electric vehicle;
    an engine power subsystem connected to the transmission system;
    a motor power subsystem connected to the transmission system; and
    a control module,
        wherein when electrical power of the vehicle is on, the control module is configured to control the hybrid electric vehicle to operate in corresponding operating modes by controlling the engine power subsystem and the motor power subsystem, wherein the operating mode comprises HEV-eco mode and HEV-s mode,
        wherein:
        (1) when the hybrid electric vehicle operates in HEV-eco and the hybrid electric vehicle operates at low power, or when the hybrid electric vehicle operates in HEV-s mode; and
        (2) the vehicle speed is zero,
        the control module is further configured to control the hybrid electric vehicle to operate by idle start-stop strategy;

wherein when the hybrid electric vehicle operates in the HEV-eco mode,
  under the conditions that a road slope is below a lower limit of slope, electric quantity of a power battery is below a lower limit of the electric quantity, or
  under the conditions that the road slope is below the lower limit of the slope and a maximum allowable discharge power of the power battery is below a lower limit of the power,
the control module is configured to control the hybrid electric vehicle to operate in a low power mode.

2. The control system according to claim 1, wherein when the hybrid electric vehicle operates by idle start-stop strategy and an engine is running, the control module is further configured to shut off the engine when all of following conditions is satisfied:
  (1) no fault is detected in a high-pressure system;
  (2) no fault is detected in a communication system;
  (3) a transmission shift lever is in park P;
  (4) the maximum allowable discharge power of the power battery in the motor power subsystem exceeds the upper limit of power; or
  (5) water temperature at an engine thermostat is greater than an upper limit of a preset temperature.

3. The control system according to claim 1, wherein when the hybrid electric vehicle operates by idle start-stop strategy and an engine turns off, the control module is further configured to turn on the engine when any of following conditions is satisfied:
  (1) a fault has been detected in a high-pressure system;
  (2) a fault has been detected in a communication system;
  (3) a transmission shift lever is not in park P;
  (4) the maximum allowable discharge power of the power battery is below a lower limit of power; or
  (5) water temperature at an engine thermostat is less than a lower limit of a preset temperature.

4. A method of controlling a hybrid electric vehicle, the method comprising:
  detecting that the hybrid electric vehicle's electric power is on;
  enabling, by a control module, the hybrid electric vehicle to enter into an operating mode through an engine power subsystem and a motor power subsystem in an instance;
  detecting that the hybrid electric vehicle operates in a HEV-eco mode;
  detecting that:
  (1) a road slope is lower than or equal to a lower limit of slope, and an electric quantity of a power battery is lower than or equal to a lower limit of the electric quantity of the power battery of the motor power subsystem; or
  (2) the road slope is lower than or equal to the lower limit of slope, and a maximum allowable discharge power of the power battery is lower than or equal to a lower limit of the maximum allowable discharge power;
  determining that the hybrid electric vehicle operates in a low power strategy;
  detecting that a hybrid electric vehicle speed is zero; and
  enabling, by the control module, the hybrid electric vehicle to operate by idle start-stop strategy.

5. The method according to claim 4, further comprising:
controlling an engine to shut off, by the control module, when the hybrid electric vehicle operates by idle start-stop strategy, the engine is running, and when all of following conditions is satisfied:
  (1) no fault is detected in a high-pressure system;
  (2) no fault is detected in a communication system;
  (3) a transmission shift lever is in park P;
  (4) the maximum allowable discharge power of the power battery of the motor power subsystem exceeds an upper limit of power; and
  (5) water temperature at an engine thermostat is greater than an upper limit of a preset temperature.

6. The method according to claim 4, further comprising:
controlling an engine to turn on, by the control module, when the hybrid electric vehicle operates by idle start-stop strategy, the engine turns off, and when any of following conditions is satisfied:
  (1) a fault has been detected in a high-pressure system;
  (2) a fault has been detected in a communication system;
  (3) a transmission shift lever is not in park P;
  (4) the maximum allowable discharge power of the power battery of the motor power subsystem is below a lower limit of power; or
  (5) water temperature at engine thermostat is less than a lower limit of a preset temperature.

* * * * *